(12) United States Patent
Yao et al.

(10) Patent No.: US 10,991,942 B2
(45) Date of Patent: Apr. 27, 2021

(54) ELECTROCHEMICAL CELLS HAVING ONE OR MORE MULTILAYER ELECTRODES

(71) Applicant: EnPower, Inc., Phoenix, AZ (US)

(72) Inventors: Adrian Yao, Phoenix, AZ (US); Jonathan Hwang, Phoenix, AZ (US)

(73) Assignee: EnPower, Inc., Phoenix, AZ (US)

( * ) Notice: Subject to any disclaimer, the term of this patent is extended or adjusted under 35 U.S.C. 154(b) by 0 days.

(21) Appl. No.: 16/812,054

(22) Filed: Mar. 6, 2020

(65) Prior Publication Data

US 2020/0212437 A1 Jul. 2, 2020

Related U.S. Application Data

(63) Continuation-in-part of application No. 15/975,695, filed on May 9, 2018.

(Continued)

(51) Int. Cl.
*H01M 4/36* (2006.01)
*H01M 10/0525* (2010.01)
*H01M 2/16* (2006.01)
*H01M 4/04* (2006.01)
*H01M 4/133* (2010.01)
*H01M 4/134* (2010.01)
*H01M 4/38* (2006.01)
(Continued)

(52) U.S. Cl.
CPC ......... *H01M 4/366* (2013.01); *H01M 4/0404* (2013.01); *H01M 4/133* (2013.01); *H01M 4/134* (2013.01); *H01M 4/386* (2013.01); *H01M 4/48* (2013.01); *H01M 4/587* (2013.01); *H01M 4/663* (2013.01); *H01M 10/0525* (2013.01); *H01M 50/46* (2021.01); *H01M 2004/027* (2013.01)

(58) Field of Classification Search
CPC .... H01M 4/366; H01M 4/0404; H01M 4/134; H01M 4/133; H01M 4/587; H01M 4/48; H01M 4/663; H01M 4/386; H01M 4/049; H01M 4/0435; H01M 4/0452; H01M 4/382; H01M 4/131; H01M 4/483; H01M 50/46; H01M 10/0525; H01M 2004/027; H01M 2010/4292
See application file for complete search history.

(56) References Cited

U.S. PATENT DOCUMENTS 5,824,120 A 10/1998 Mitchell et al.
7,682,740 B2 3/2010 Yong et al.
(Continued)

FOREIGN PATENT DOCUMENTS

JP 2016-207258 A 12/2016
JP 2018-066959 A 4/2018
(Continued)

*Primary Examiner* — Ula C Ruddock
*Assistant Examiner* — Matthew W Van Oudenaren
(74) *Attorney, Agent, or Firm* — Kolitch Romano LLP

(57) ABSTRACT

Electrochemical cells of the present disclosure may include one or more multilayered electrodes. Each multilayered electrode may be configured such that active materials of the layer closest to the current collector have a lower energy to lithiate per mole, a higher energy to delithiate per mole, a different solid state diffusivity, and/or a different average particle size. This arrangement counteracts, for example, natural gradient fields and undesirable polarization found in standard lithium-ion batteries.

13 Claims, 18 Drawing Sheets

Related U.S. Application Data

(60) Provisional application No. 62/647,300, filed on Mar. 23, 2018.

(51) Int. Cl.
*H01M 4/48* (2010.01)
*H01M 4/587* (2010.01)
*H01M 4/66* (2006.01)
*H01M 50/46* (2021.01)
*H01M 4/02* (2006.01)

(56) References Cited

U.S. PATENT DOCUMENTS

| | | |
|---|---|---|
| 7,781,098 B2 | 8/2010 | Chiang et al. |
| 8,435,671 B2 | 5/2013 | Zaghib et al. |
| 9,178,209 B2 | 11/2015 | Kim et al. |
| 9,564,639 B2 | 2/2017 | Huang |
| 2002/0028380 A1 | 3/2002 | Tanjo et al. |
| 2003/0230532 A1 | 12/2003 | Rosenblatt et al. |
| 2004/0131934 A1 | 7/2004 | Sugnaux et al. |
| 2005/0026037 A1 | 2/2005 | Riley, Jr. |
| 2005/0236732 A1 | 10/2005 | Brosch et al. |
| 2008/0057401 A1* | 3/2008 | Mori .................... H01M 4/587 429/303 |
| 2008/0095930 A1 | 4/2008 | Natsume et al. |
| 2009/0087731 A1 | 4/2009 | Fukui et al. |
| 2009/0155694 A1 | 6/2009 | Park |
| 2010/0092846 A1 | 4/2010 | Inagaki et al. |
| 2010/0285356 A1 | 11/2010 | Choi et al. |
| 2011/0293990 A1 | 12/2011 | Ryu et al. |
| 2012/0164530 A1 | 6/2012 | Temmyo et al. |
| 2012/0301789 A1 | 11/2012 | Loveness et al. |
| 2013/0130100 A1 | 5/2013 | Kurata et al. |
| 2013/0202960 A1 | 8/2013 | Kim |
| 2013/0216897 A1* | 8/2013 | Kim .................... H01M 4/366 429/163 |
| 2014/0059820 A1 | 3/2014 | Wright et al. |
| 2014/0154401 A1 | 6/2014 | Salot et al. |
| 2014/0178769 A1 | 6/2014 | Pirk et al. |
| 2014/0255779 A1 | 9/2014 | Min et al. |
| 2014/0287316 A1* | 9/2014 | Ahn .................... H01M 10/0525 429/231.8 |
| 2015/0064556 A1 | 3/2015 | Lee et al. |
| 2015/0104714 A1 | 4/2015 | Galande et al. |
| 2016/0133394 A1* | 5/2016 | Sakshaug .............. H01G 11/34 361/502 |
| 2016/0211513 A1 | 7/2016 | Hao et al. |
| 2016/0211523 A1 | 7/2016 | Ueda et al. |
| 2016/0336617 A1 | 11/2016 | Yamazaki |
| 2017/0033350 A1 | 2/2017 | Mizuno et al. |
| 2017/0040603 A1 | 2/2017 | Chu et al. |
| 2017/0062812 A1 | 3/2017 | Kim et al. |
| 2018/0138493 A1 | 3/2018 | Liu et al. |
| 2018/0287145 A1 | 10/2018 | Lee et al. |
| 2019/0051906 A1 | 2/2019 | Rhee et al. |
| 2019/0288318 A1 | 9/2019 | Edmundson et al. |

FOREIGN PATENT DOCUMENTS

| | | |
|---|---|---|
| KR | 10-2017-0025992 A | 3/2017 |
| WO | 2011/029058 A2 | 3/2011 |

* cited by examiner

ELECTROCHEMICAL CELLS HAVING ONE OR MORE MULTILAYER ELECTRODES

CROSS-REFERENCES

This application is a continuation in part (CIP) of U.S. patent application Ser. No. 15/975,695, which claims the benefit under 35 U.S.C. § 119(e) of the priority of U.S. Provisional Patent Application Ser. No. 62/647,300, filed Mar. 23, 2018, the entireties of which are hereby incorporated by reference for all purposes.

FIELD

This disclosure relates to devices and methods for electrochemical devices that include a composite porous electrode. More specifically, disclosed embodiments relate to multilayer electrodes for batteries.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to improved electrochemical cells and their electrodes. In some embodiments, an electrochemical cell may include a first electrode separated from a second electrode by a liquid-permeable separator; and an electrolyte disposed generally throughout the first and second electrodes; the first electrode comprising a first current collector substrate and an active material composite layered onto the first current collector substrate, wherein the active material composite comprises: a first layer adjacent the first current collector substrate and including a plurality of first active material particles adhered together by a first binder, the first active material particles configured to have a first solid state diffusivity and a first free energy to lithiate per mole; a second layer adjacent the liquid-permeable separator and including a plurality of second active material particles configured to have a second solid state diffusivity and a second free energy to lithiate per mole; wherein the first solid state diffusivity is greater than the second solid state diffusivity, and the first free energy to lithiate is less than the second free energy to lithiate.

In some embodiments, an electrochemical cell may include a first electrode separated from a second electrode by a liquid-permeable separator; and an electrolyte disposed generally throughout the first and second electrodes; the first electrode comprising a first current collector substrate and an active material composite layered onto the first current collector substrate, wherein the active material composite comprises: a first layer adjacent the first current collector substrate and including a plurality of first active material particles adhered together by a first binder, the first active material particles configured to have a first solid state diffusivity and a first free energy to delithiate per mole; a second layer adjacent the liquid-permeable separator and including a plurality of second active material particles configured to have a second solid state diffusivity and a second free energy to delithiate per mole; wherein the first solid state diffusivity is lower than the second solid state diffusivity, and the first free energy to delithiate is greater than the second free energy to delithiate.

In some embodiments, an electrode may include a current collector substrate; and an active material composite layered onto the substrate, wherein the active material composite comprises: a first layer adjacent the current collector substrate and including a plurality of first active material particles configured to have a first solid state diffusivity and a first energy to lithiate per mole; a second layer adjacent the first layer and including a plurality of second active material particles configured to have a second solid state diffusivity and a second energy to lithiate per mole; wherein the first solid state diffusivity is greater than the second solid state diffusivity, and the first energy to lithiate per mole is less than the second energy to lithiate per mole.

Features, functions, and advantages may be achieved independently in various embodiments of the present disclosure, or may be combined in yet other embodiments, further details of which can be seen with reference to the following description and drawings.

DETAILED DESCRIPTION

Figure 1:
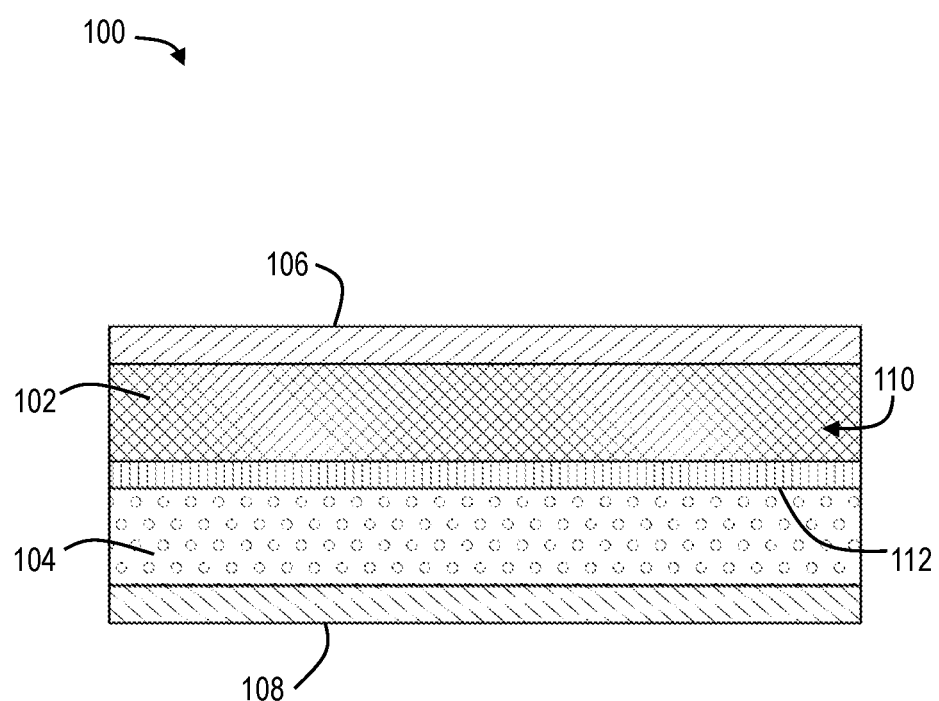
FIG. 1 is a schematic sectional view of an illustrative electrochemical cell.

Various aspects and examples of an electrochemical cell having an electrode with multiple layers, as well as related methods, are described below and illustrated in the associated drawings. Unless otherwise specified, an electrochemical cell having an electrode with multiple layers as described herein, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/ or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; and (5) Conclusion. The Examples, Components, and Alternatives section is further divided into subsections A through G, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Active material fraction" means the mass of active material divided by the total mass of an electrode (or a cell).

"Active volume fraction" means the volume of active material divided by the total volume of an electrode (or a cell).

"NCA" means Lithium Nickel Cobalt Aluminum Oxide ($LiNiCoAlO_2$).

"NMC" or "NCM" means Lithium Nickel Cobalt Manganese Oxide ($LiNiCoMnO_2$).

"LFP" means Lithium Iron Phosphate ($LiFePO_4$).

"LMO" means Lithium Manganese Oxide ($LiMn_2O_4$).

"LNMO" means Lithium Nickel Manganese Spinel ($LiNi_{0.5}Mn_{1.5}O_4$).

"LCO" means Lithium Cobalt Oxide ($LiCoO_2$).

"LTO" means Lithium Titanate ($Li_2TiO_3$).

"NMO" means Lithium Nickel Manganese Oxide ($Li(Ni_{0.5}Mn_{0.5})O_2$).

"Li" means lithium.

"Li+" or "Li-ion" means lithium ion.

"Areal capacity" means area-normalized specific capacity.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

The present disclosure describes specific electrodes and bipolar electrochemical cells (e.g., batteries, redox supercapacitors, or the like) having improved characteristics compared with known designs. The present teachings may include electrodes suitable for use in a lithium ion battery cell.

As described herein, electrodes may be structured to have multiple layers containing selected active materials with different lithiation energies and/or solid-state diffusion coefficients. This facilitates improved rate capabilities of the entire electrode bulk upon lithiation or delithiation. Gradient fields (e.g., concentration gradients within the electrolyte) naturally form in non-equilibrium conditions, such as upon charging or discharging of a cell. This is especially the case when such charging or discharging is conducted at increased rates. The result of these gradient fields is polarization within the cell. While this is an inevitable phenomenon in any Li-ion battery, excessive polarization is detrimental to performance. For example, excessive polarization can lead to low capacity utilization before threshold cutoff voltages are reached. In other examples, excessive polarization can result in unwanted lithium plating reactions on the anode surface. This type of plating severely impairs performance and poses a safety risk.

Accordingly, to counteract the natural gradient fields that would otherwise form in traditional battery electrodes, electrodes of the present disclosure comprise active materials spatially oriented within the thickness of an electrode bulk in a strategic manner. In some examples, an electrode may have first active materials that require less energy to lithiate closer to the current collector, and second active materials that require more energy to lithiate closer to the separator. This arrangement enables the electrode to lithiate in a "backfill" manner. In other words, the electrode has a reaction front that proceeds from the current collector toward the separator, as opposed to the opposite way around (in non-optimized electrodes).

One such example is an anode that has a first active material having a higher lithiation voltage (with respect to Li/Li+) situated closer to the current collector and a second active material having a lower lithiation voltage (with respect to Li/Li+) situated closer to the separator. In this example, the anode is optimized for improved lithiation properties (e.g. upon charging of the Li-ion cell) to accept Li-ions at an increased charging rate.

A similar concept is an illustrative cathode version, where the cathode comprises a first active material with a lower lithiation voltage (with respect to Li/Li+) disposed closer to the current collector, and a second active material with a higher lithiation voltage (with respect to Li/Li+) situated closer to the separator. In this example, the cathode is optimized for improved lithiation properties (e.g. upon discharging of the Li-ion cell) to accept Li-ions at an increased discharge rate.

Other ways of improving lithiation rate capabilities of an electrode include situating active materials (a) with increased solid-state diffusion coefficients and/or (b) having active material particles with smaller particle sizes, closer to the current collector so as to counteract the naturally forming gradient fields.

An electrode having multiple layers may have regions of lower and higher lithium ion accepting capability, such that the overall electrode has an increased lithium-accepting capability as compared with a homogeneous electrode of an equivalent loading, thickness, and/or chemistry. Additionally, an electrode having multiple layers may have regions of lower and higher lithium donating capability, such that the overall electrode has increased lithium-donating capability as compared with a homogeneous electrode of an equivalent loading, thickness, and/or chemistry. By having an electrode with multiple layers in an electrochemical cell, the cell may exhibit increased power density on charging or discharging depending on which electrode(s) (i.e., cathode, anode, or both) feature multiple layers, and depending on how the multiple layers in the electrodes are configured.

Layers within electrodes may be differentiated using one or more of several methods. The first two are based on the active materials utilized. The third is based on the particle sizes of those active materials. First, each layer may have a different energy of lithiation or delithiation. Second, each layer may have a different solid state diffusion coefficient. Third, each layer may have a different distribution of particle sizes.

An electrode may have a thickness defined as the distance along a direction perpendicular to the plane of a current collector to which the electrode is coupled, measured from the current collector to an opposing major surface of the electrode. The opposing major surface (AKA the "upper" surface) may be substantially planar. This upper surface of the electrode may mate with a separator, a gel electrolyte, or a solid electrolyte when the electrode is included in a cell. In some examples, an electrode described herein and having multiple layers may have a thickness between approximately 10 μm and approximately 200 μm. Each layer of an electrode may also have a thickness, defined in the same direction as that of the electrode and measured between opposing faces of the layer.

Examples, Components, and Alternatives

The following sections describe selected aspects of exemplary electrodes and electrochemical cells, as well as related systems and/or methods. The examples in these sections are intended for illustration and should not be interpreted as limiting the scope of the present disclosure. Each section may include one or more distinct embodiments or examples, as well as contextual or related information, function, and/or structure.

A. Illustrative Electrodes and Cells

Figure 2:
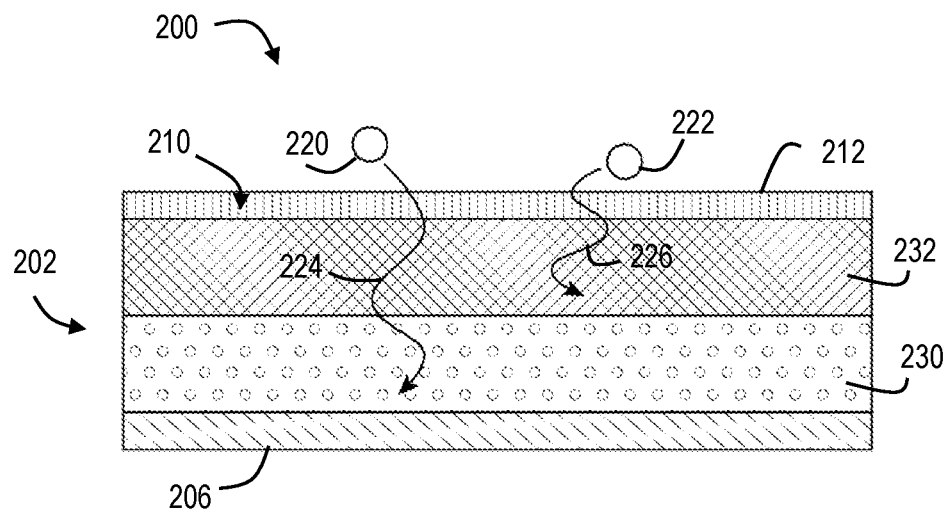
FIG. 2 is a schematic sectional view of a portion of an electrochemical cell having a first illustrative multilayered electrode, depicted accepting lithium ions in a lithiation process.
Figure 3:
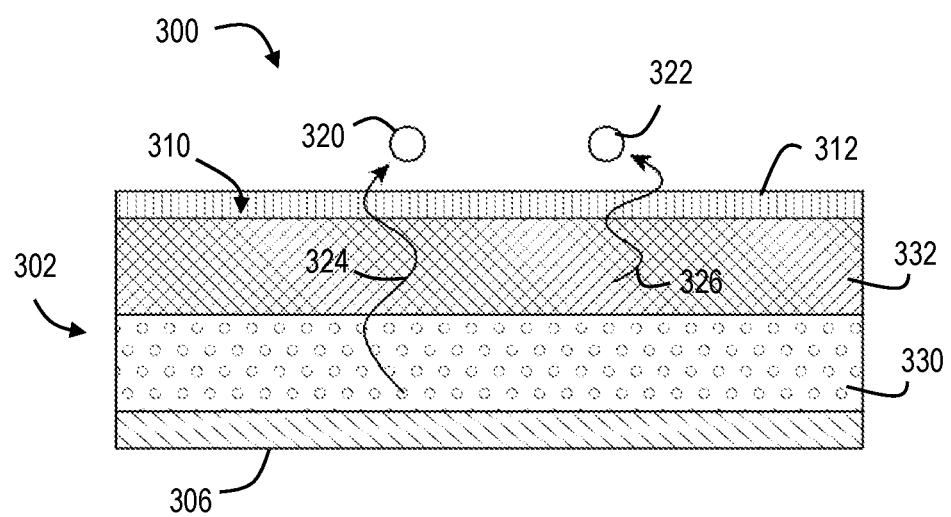
FIG. 3 is a schematic sectional view of a portion of an electrochemical cell having a second illustrative multilayered electrode, depicted releasing lithium ions in a delithiation process.

As shown in FIGS. 1-3, this section describes illustrative electrodes and electrochemical cells in accordance with aspects of the present disclosure. FIG. 1 is a schematic sectional diagram of an illustrative electrochemical cell, and FIGS. 2 and 3 are schematic sectional diagrams of two different types of illustrative multilayer electrodes suitable for use in an electrochemical cell.

Referring now to FIG. 1, an electrochemical cell 100 is illustrated in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102, and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable, and enables the movement (flow) of ions within electrolyte 110 and between each of the electrodes. In some embodiments, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and chalcogenides. On the other hand, cathode 102 may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc.).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

Turning to FIG. 2, a schematic sectional view of a portion of an electrochemical cell 200 is depicted. Cell 200 has a multilayered electrode 202, shown accepting lithium ions 220 and 222 during a lithiation process. Cell 200 is an example of electrochemical cell 100 of FIG. 1, and includes a separator 212, an electrolyte 210, and a current collector 206. Electrode 202 may be a cathode or an anode, and includes a first layer 230 and a second layer 232. First layer 230 is adjacent current collector 206; second layer 232 is located adjacent (intermediate) the first layer and separator 212. For consistency, all examples of the present disclosure follow a similar convention, where the "first" layer is defined adjacent the current collector and the "second" layer is defined adjacent the separator. First layer 230 and second layer 232 may each be substantially planar, with thicknesses measured relative to a direction perpendicular to current collector 206.

In the present example, electrode 202 is depicted as accepting lithium, for example under a constant potential or constant current, whereby lithium ions 220 and 222 are induced to react (e.g., intercalate) with active material present within first layer 230 and second layer 232. Lithium ions 220 and 222 migrate toward current collector 206 under diffusive and electric field effects. In this example, ion 220 follows a path 224 within electrolyte 210, through separator 212, second layer 232, and a portion of first layer 230, until it lithiates an active material particle within first layer 230. In contrast, lithium ion 222 follows a path 226 within electrolyte 210, through separator 212 and a portion of second layer 232, until it lithiates an active material particle within second layer 232.

In general, path 224 of the ion traveling through the separator to active material within the first layer will be longer than path 226 of the ion traveling through the separator to active material within the second layer. Additionally, the ion on path 224 travels a longer distance while in second layer 232 than does the ion on path 226.

In a standard electrode, one consequence of the disparity in path lengths 224 and 226 is that a residence time in the second layer is likely to be greater than a residence time in the first layer for a given lithium ion. Another consequence of the disparity in path lengths 224 and 226 is that a lithium ion entering electrode 202 is more likely to react with an active material particle within second layer 232 than first layer 230. Accordingly, a gradient reaction field may be generated in such electrodes, which may negatively impact cell performance by: (1) a polarization overpotential in electrolyte 210 leading to parasitic energy losses within the electrochemical cell; and (2) underutilization of active material of first layer 230 compared to the active material of second layer 232 (causing, e.g., lower apparent lithium-ion battery capacity and/or longer time to compete acceptance of lithium by electrode 202 at lower power).

However, in the present example, the disparity in path lengths and resulting gradient reaction field is at least partially mitigated by electrode 202 having a first active material included in first layer 230 and a second active material included in second layer 232. The first active material is configured to be different from the second active material, such that at least one of the following is true:
  (i) the first active material is chemically different from the second active material and a free energy per mole to lithiate (AKA free energy to lithiate, or FEL) the first active material is lower than a free energy to lithiate the second active material;
  (ii) a solid state diffusion (SSD) coefficient of the first active material is greater than a solid state diffusion coefficient of the second active material; and/or
  (iii) a particle size distribution of the first active material includes particles that are substantially smaller than a particle size distribution of the second active material.

Where item (i) is true (i.e., lower FEL in the first layer), the longer path is mitigated by a sequential reaction timeline, where lithiation of first layer 230 preferentially commences at a time before lithiation of second layer 232. Furthermore, in examples where either or both of items (ii) (greater SSD coefficient in first layer) and/or (iii) (smaller particle size in first layer) is also true, the advantage of the sequential reaction timeline is further improved by increasing utilization of the active material of first layer 230 prior to onset of lithiation of the active material of second layer 232 (and thus prior to onset of the gradient reaction field with its associated disadvantages).

In this example, a thickness of second layer 232 is chosen to be equal to or less than a selected maximum thickness. The maximum thickness is determined by the microscopic architecture of second layer 232, i.e., active material particles with distinct shapes and sizes arranged in a particular way in three-dimensional space. The factors that describe this microscopic architecture include a distribution of the active material particle sizes, a porosity, and a tortuosity within the second layer. If second layer 232 has a thickness greater than the maximum thickness, transport through the second layer to the first layer may become so tortuous that the benefit of properties (i), (ii) and (iii) above are negated.

In examples where electrode 202 is an anode within the cell, lithiation of first layer 230 preferentially commences at a time before lithiation of second layer 232. This mitigates, at least in part, the gradient field and disparity in path lengths lithium ions must travel throughout electrode 202. A lithium ion battery having an anode with a layered configuration similar to that of electrode 202 is capable of exhibiting increased charge rate acceptance compared with a conventional lithium ion battery having a typical anode with a substantially homogeneous microstructure throughout its thickness. Such a battery is also capable of exhibiting increased charge rate acceptance compared with a lithium ion battery having an anode with a layered configuration inverse to that of electrode 202. The inverse configuration is also likely to have a charge acceptance performance inferior to a conventional lithium ion battery having a typical homogeneous anode microstructure. This anode design consideration is useful for designing a lithium ion battery capable of being charged at increased rates. Mitigating the onset of a significant gradient reaction field on the anode also helps prevent metallic lithium deposition (i.e. lithium plating) due to overpolarization upon charging.

Electrode 202 may be constructed as an anode using any suitable materials configured to produce an anode having a lower free energy to lithiate and a higher solid state diffusivity in the first layer than in the second layer. Recall that the first layer is defined adjacent the current collector and the second layer is defined adjacent the separator. In some examples, the first active material of the first layer comprises one or more of a hard carbon (or additional non-graphitic carbon), silicon monoxide, other silicon oxides, titanium dioxide, titanate, graphene, and an alloying material (e.g., tin, silicon, germanium, or the like), and the second active material of the second layer comprises graphitic carbons. In some examples, the first active material of the first layer comprises titanium dioxide or titanate, and the second active material of the second layer comprises one or more of a hard carbon (or additional non-graphitic carbon), graphitic carbons, silicon monoxide, other silicon oxides, graphene, and an alloying material (e.g., tin, silicon, germanium, or the like).

In examples where electrode 202 is a cathode within the cell, lithiation of first layer 230 commences at a time before lithiation of second layer 232. This mitigates, at least in part, the gradient field and disparity in path lengths lithium ions must travel throughout electrode 202. A lithium ion battery having a cathode with a layered configuration similar to that of electrode 202 is capable of exhibiting increased discharge rate capability compared with a conventional lithium ion battery having a typical cathode with a substantially homogeneous microstructure throughout its thickness. Such a battery is also capable of exhibiting increased discharge rate performance compared with a lithium ion battery having a cathode with a layered configuration inverse to that of the electrode 202. The inverse configuration is also likely to have a discharge rate performance inferior to a conventional lithium ion battery having a typical homogeneous cathode microstructure. This cathode design consideration is useful for designing a lithium ion battery capable of being discharged at increased rates.

Electrode 202 may be constructed as a cathode using any suitable materials configured to produce an anode having a lower free energy to lithiate and a higher solid state diffusivity in the first layer than in the second layer. Again, recall that the first layer is defined adjacent the current collector and the second layer is defined adjacent the separator. In some examples, the first active material of the first layer comprises LFP, and the second active material of the second layer comprises one or more of NMC, NCA, LCO, and LMO. In some examples, the first active material of the first layer comprises one or more of NMC and NCA, and the second active material of the second layer comprises LMO and/or LCO.

Turning now to FIG. 3, a schematic sectional view of a portion of an electrochemical cell 300 is depicted. Cell 300 has a multilayered electrode 302, shown donating lithium ions 320 and 322 during a delithiation process. Cell 300 is an example of electrochemical cell 100 of FIG. 1. The electrochemical cell includes a separator 312, an electrolyte 310, and a current collector 306. Electrode 302 may be a cathode or an anode, and includes a first layer 330, and a second layer 332. Per the convention described above, first layer 330 is adjacent to current collector 306, and second layer 332 is disposed adjacent (intermediate) the first layer and separator 312. First layer 330 and second layer 332 may each be substantially planar, with thicknesses measured relative to a direction perpendicular to current collector 306.

In the present example, electrode 302 is depicted donating lithium, for example under a constant potential or constant current, whereby lithium ions 320 and 322 are induced to react (e.g., deintercalate) and are released from active material present within first layer 330 and second layer 332. Lithium ions 320 and 322 migrate toward separator 312 under diffusive and electric field effects. Lithium ion 320 is shown delithiated (released) from an active material particle within first layer 330, then following a path 324 within electrolyte 310 through a portion of first layer 330, second layer 332, and separator 312. In contrast, lithium ion 322 is shown delithiated from an active material particle within second layer 332, then following a path 326 within electrolyte 310 through a portion of second layer 332 and separator 312.

In general, path 324 of lithium ion 320 traveling from within first layer 330 to separator 312 will be longer than path 326 of lithium ion 322 traveling from within second layer 332 to separator 312. Furthermore, a first distance between the start of path 324 and the separator is greater than a second distance between the start of path 326 and the separator.

In a standard electrode, one consequence of these differences in paths 324 and 326 is that lithium ion 320 experiences charge repulsion effects from lithium ion 322, thereby inhibiting travel of lithium ion 320 to the separator, causing charge build-up within the electrode. Accordingly, a gradient reaction field may be generated, negatively impacting performance by: (1) a polarization overpotential in the electrolyte leading to parasitic energy losses within the cell; and (2) starvation of lithium ions in the electrolyte (causing, e.g., lower apparent lithium-ion battery capacity and/or longer time to complete the release of lithium by the electrode, at lower power).

However, in the present example, the disparity in path lengths and resulting gradient reaction field is at least partially mitigated by electrode 302 having a first active material included in first layer 330 and a second active material included in second layer 332. The first active material is configured to be different from the second active material, such that at least one of the following is true:

(i) the first active material is chemically different from the second active material and a free energy per mole to delithiate (AKA free energy to delithiate, or FED) the first active material is higher than a free energy to delithiate the second active material;

(ii) a solid state diffusion (SSD) coefficient of the second active material is greater than a solid state diffusion coefficient of the first active material; and/or (iii) a particle size distribution of the first active material includes particles that are substantially larger than a particle size distribution of the second active material.

Where item (i) is true (i.e., greater FED in the first layer), the longer path (charge repulsion of lithium ions intermediate to the separator) is mitigated by a sequential reaction timeline where delithiation of the second layer commences at a time before delithiation of the first layer. Furthermore, in examples where either or both of items (ii) (greater SSD coefficient in second layer) and/or (iii) (i.e., smaller particle size in second layer) is also true, the advantage of the sequential reaction timeline is further improved by maximizing depletion of the active material of the second layer 332 prior to onset of delithiation of the active material of the first layer 330 (and thus prior to onset of the gradient reaction field with its associated disadvantages).

In this example, a thickness of second layer 332 is chosen to be equal to or less than a selected maximum thickness. The maximum thickness is determined by the microscopic architecture of second layer 332, i.e., active material particles with distinct shapes and sizes arranged in a particular way in three-dimensional space. The factors that describe this microscopic architecture include a distribution of the active material particle sizes, a porosity, and a tortuosity within the second layer. If second layer 332 has a thickness greater than the maximum thickness, transport through the second layer to the separator may become so tortuous that the benefit of properties (i), (ii) and (iii) above are negated.

In examples where electrode 302 is an anode within the cell, delithiation of second layer 332 commences at a time before delithiation of first layer 330. This mitigates, at least in part, the gradient field and disparity in path lengths lithium ions must travel throughout electrode 302. A lithium ion battery having an anode with a layered configuration similar to that of electrode 302 is capable of exhibiting increased discharge rate capability compared with a conventional lithium ion battery having a typical anode with a substantially homogeneous microstructure throughout its thickness. Such a battery is also capable of exhibiting increased discharge rate capability compared with a lithium ion battery having an anode with a layered configuration inverse to that of electrode 302. The inverse configuration is also likely to have a discharge rate performance inferior to a conventional lithium ion battery having a typical anode with a substantially homogeneous microstructure. This anode design consideration is useful for designing a lithium ion battery capable of being discharged at increased rates.

Electrode 302 may be constructed as an anode using any suitable materials configured to produce an anode having a higher free energy to delithiate and a lower solid state diffusivity in the first layer than in the second layer. Recall that the first layer is defined adjacent the current collector and the second layer is defined adjacent the separator. In some examples, the first active material of the first layer comprises graphitic carbons, and the second active material of the second layer comprises one or more of a hard carbon (or additional non-graphitic carbon), silicon monoxide, other silicon oxides, graphene, titanium dioxide, titanate, and an alloying material (e.g., tin, silicon, germanium, or the like). In some examples, the first active material of the first layer comprises one or more of a hard carbon (or additional non-graphitic carbon), graphitic carbons, silicon monoxide, other silicon oxides, and an alloying material (e.g., tin, silicon, germanium, or the like), and the second active material of the second layer comprises one or more of titanium dioxide or titanate.

In examples where electrode 302 is a cathode within the cell, delithiation of second layer 332 commences at a time before delithiation of first layer 330. This mitigates, at least in part, the gradient field and disparity in path lengths lithium ions must travel throughout electrode 302. A lithium ion battery having a cathode with a layered configuration similar to that of electrode 302 is capable of exhibiting increased charge rate capability compared with a conventional lithium ion battery having a typical cathode with a substantially homogeneous microstructure throughout its thickness. Such a battery is also capable of exhibiting increased charge rate acceptance compared with a lithium ion battery having a cathode with a configuration inverse to that of electrode 302. The inverse configuration is also likely to have a charge rate performance inferior to a conventional lithium ion battery having a typical cathode with a substantially homogeneous microstructure. This cathode electrode design consideration is useful for designing a lithium ion battery capable of being charged at increased rates.

Electrode 302 may be constructed as a cathode using any suitable materials configured to produce an anode having a higher free energy to delithiate and a higher solid state diffusivity in the first layer than in the second layer. Again, recall that the first layer is defined adjacent the current collector and the second layer is defined adjacent the separator. In some examples, the first active material of the first layer comprises one or more of NMC, NCA, LCO, or LMO, and the second active material of the second layer comprises LFP. In some examples, the first active material of the first layer comprises LMO or LCO, and the second active material of the second layer comprises one or more of NMC and NCA.

With respect to the electrode of FIG. 2, whether an anode or a cathode, the first active material particles of the first layer may have a first distribution of sizes (e.g., by volume) smaller than a second distribution of sizes (e.g., by volume) of the second active material particles of the second layer. In some examples, the first distribution may be smaller than the second distribution by having a median particle size (e.g., by volume) smaller than a median particle size (e.g., by volume) of the second distribution. In some examples, the first distribution may be smaller than the second distribution by having a mean particle size (e.g., by volume) smaller than a mean particle size (e.g., by volume) of the second distribution. In some examples, the first distribution may be smaller than the second distribution by having one or more modes of particle size (e.g., by volume) smaller than a lowest mode of particle size (e.g., by volume) of the second distribution. In some examples, the first distribution may be smaller than the second distribution by having a tenth percentile of the first distribution smaller than a tenth percentile of the second distribution.

With respect to the electrode of FIG. 3, whether an anode or a cathode, the first active material particles of the first layer may have a first distribution of sizes (e.g., by volume) larger than a second distribution of sizes (e.g., by volume) of the second active material particles of the second layer. In some examples, the first distribution may be larger than the second distribution by having a median particle size (e.g., by volume) larger than a median particle size (e.g., by volume) of the second distribution. In some examples, the first distribution may be larger than the second distribution by having a mean particle size (e.g., by volume) larger than a mean particle size (e.g., by volume) of the second distribution. In some examples, the first distribution may be larger than the second distribution by having one or more modes of particle size (e.g., by volume) larger than a lowest mode of particle size (e.g., by volume) of the second distribution. In some examples, the first distribution may be larger than the second distribution by having a tenth percentile of the first distribution larger than a tenth percentile of the second distribution.

B. Illustrative Cells Having One Homogeneous Electrode and One Multilayer Electrode As shown in FIGS. 4-7, this section describes illustrative electrochemical cells having one homogeneous electrode and one multilayer electrode in accordance with aspects of the present disclosure.

Figure 4:
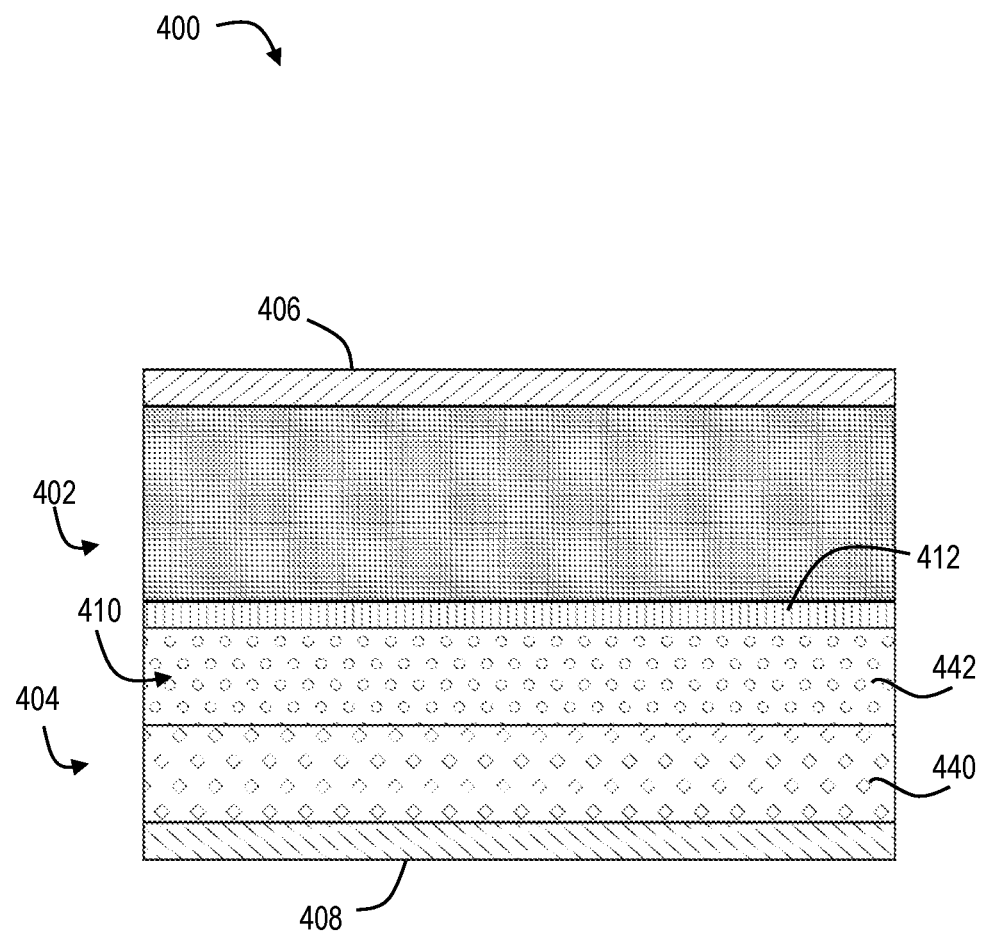
FIG. 4 is a schematic sectional view of an illustrative electrochemical cell having one multilayered electrode and one homogeneous electrode, in accordance with aspects of the present disclosure.

FIG. 4 is a schematic sectional view of an illustrative electrochemical cell 400 having a homogenous cathode 402 and a multilayer anode 404. Electrochemical cell 400 is an example of electrochemical cell 100 of FIG. 1, and anode 404 is an example of electrode 202 of FIG. 2. Cell 400 includes a separator 412, an electrolyte 410, and current collectors 406 and 408. An electrolyte 410 enables the transport of ions between cathode 402 and anode 404, and a liquid permeable polymer separator 412 separates and electronically insulates the electrodes from each other.

Homogeneous cathode 402 includes a single layer adjacent to current collector 406 and separator 412. Cathode 402 is coated on current collector 406 in such a way that all parts of the electrode are substantially similar in terms of their chemistry (e.g., of active material particles, binder, conductive additive, etc.), and microstructure (e.g., active mass fraction, porosity, tortuosity, etc.) within the volume of the electrode composite. Cathode 402 may be substantially planar, with thicknesses measured relative to a direction perpendicular to current collector 406. First layer 440 and second layer 442 each may be substantially planar, with thicknesses measured relative to a direction perpendicular to current collector 408.

As mentioned above, multilayer anode 404 is an example of electrode 202. Accordingly, the components and characteristics of anode 404 are substantially identical to corresponding elements and characteristics described above with respect to electrode 202. Multilayer anode 404 includes a first layer 440 and a second layer 442. First layer 440 is adjacent to the current collector 408, and second layer 442 is disposed adjacent and intermediate the first layer and separator 412.

First layer 440 includes first active material particles and the second layer 442 includes second active material particles. In some examples, first active material of the first layer 440 has a greater active volume fraction and/or active mass fraction than active material of the second layer 442. In some examples, active material of the first layer 440 has a lower active volume fraction and/or active mass fraction than active material of the second layer 442.

Characteristics regarding material composition and size distributions of the layers of anode 404 are substantially as described with respect to electrode 202. Subsequently, a free energy to lithiate the first active material of first layer 440 may be lower than a free energy to lithiate the second active material of second layer 442. Furthermore, a solid state diffusivity of the first active material of first layer 440 may be greater than a solid state diffusivity of the second active material of second layer 442.

Figure 5:
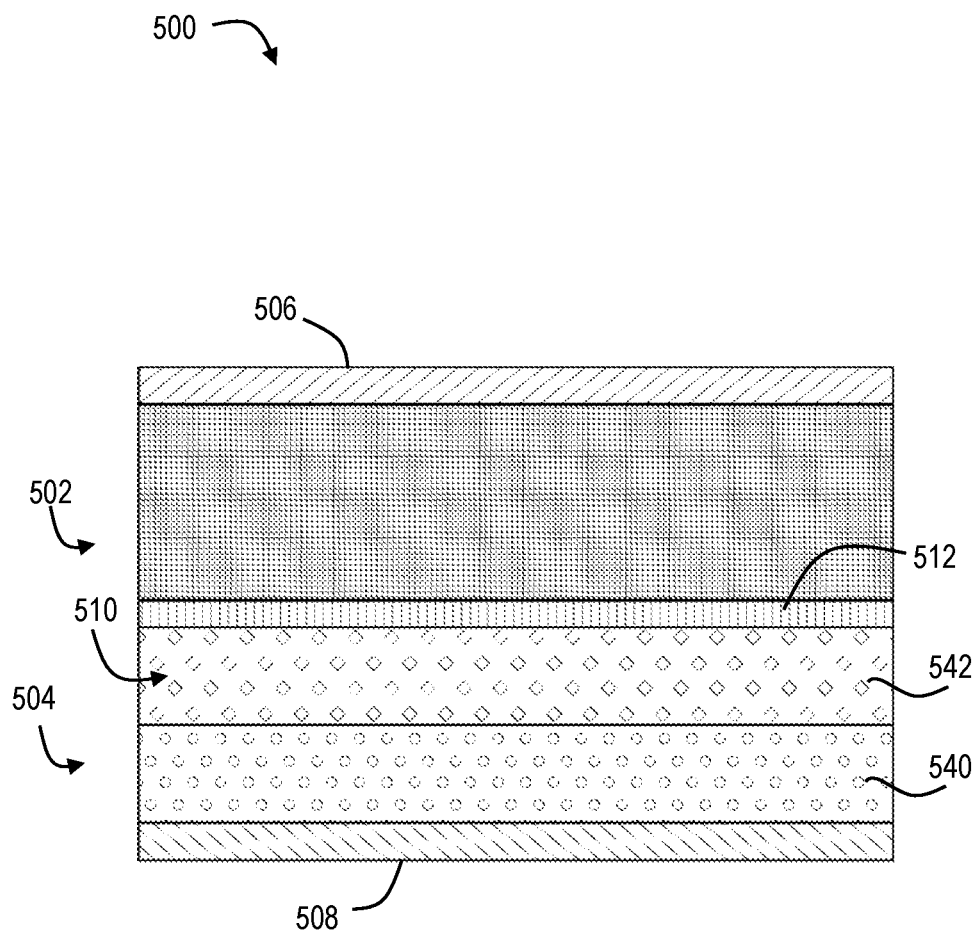
FIG. 5 is a schematic sectional view of another illustrative electrochemical cell having one multilayered electrode and one homogeneous electrode, in accordance with aspects of the present disclosure.

FIG. 5 is a schematic sectional view of an illustrative electrochemical cell 500 having a homogeneous cathode 502 and a multilayered anode 504. Electrochemical cell 500 is an example of electrochemical cell 100 of FIG. 1, and anode 504 is an example of electrode 302 of FIG. 3. Cell 500 includes a separator 512, an electrolyte 510, and current collectors 506 and 508. An electrolyte 510 enables the transport of ions between cathode 502 and anode 504 and a liquid permeable polymer separator 512 separates and electronically insulates the electrodes from each other.

Homogeneous cathode 502 includes a single layer adjacent to current collector 506 and separator 512. Cathode 502 is coated on current collector 506 in such a way that all parts of the electrode are substantially similar in terms of their chemistry (e.g., of active material particles, binder, conductive additive, etc.), and microstructure (e.g., of active mass fraction, porosity, tortuosity, etc.) within the volume of the electrode composite. Cathode 502 may be substantially planar, with thicknesses measured relative to a direction perpendicular to the current collector 506.

As mentioned above, multilayer anode 504 is an example of electrode 302. Accordingly, the components and characteristics of anode 504 are substantially identical to corresponding elements and characteristics described above with respect to electrode 302. Multilayer anode 504 includes a first layer 540 and a second layer 542. First layer 540 is adjacent to current collector 508, and second layer 542 is located adjacent (intermediate) the first layer and separator 512. First layer 540 and second layer 542 each may be substantially planar, with thicknesses measured relative to a direction perpendicular to current collector 508.

First layer 540 includes first active material particles and second layer 542 includes second active material particles. In some examples, first active material of first layer 540 has a greater active volume fraction and/or active mass fraction than active material of second layer 542. In some examples, active material of first layer 540 has a lower active volume fraction and/or active mass fraction than active material of second layer 542.

Characteristics regarding material composition and size distributions of the layers of anode 504 are substantially as described with respect to electrode 302. Subsequently, a free energy to delithiate the first active material of first layer 540 may be higher than a free energy to delithiate the second active material of second layer 542. Furthermore, a solid state diffusivity of the first active material of first layer 540 may be less than a solid state diffusivity of the second active material of second layer 542.

Figure 6:
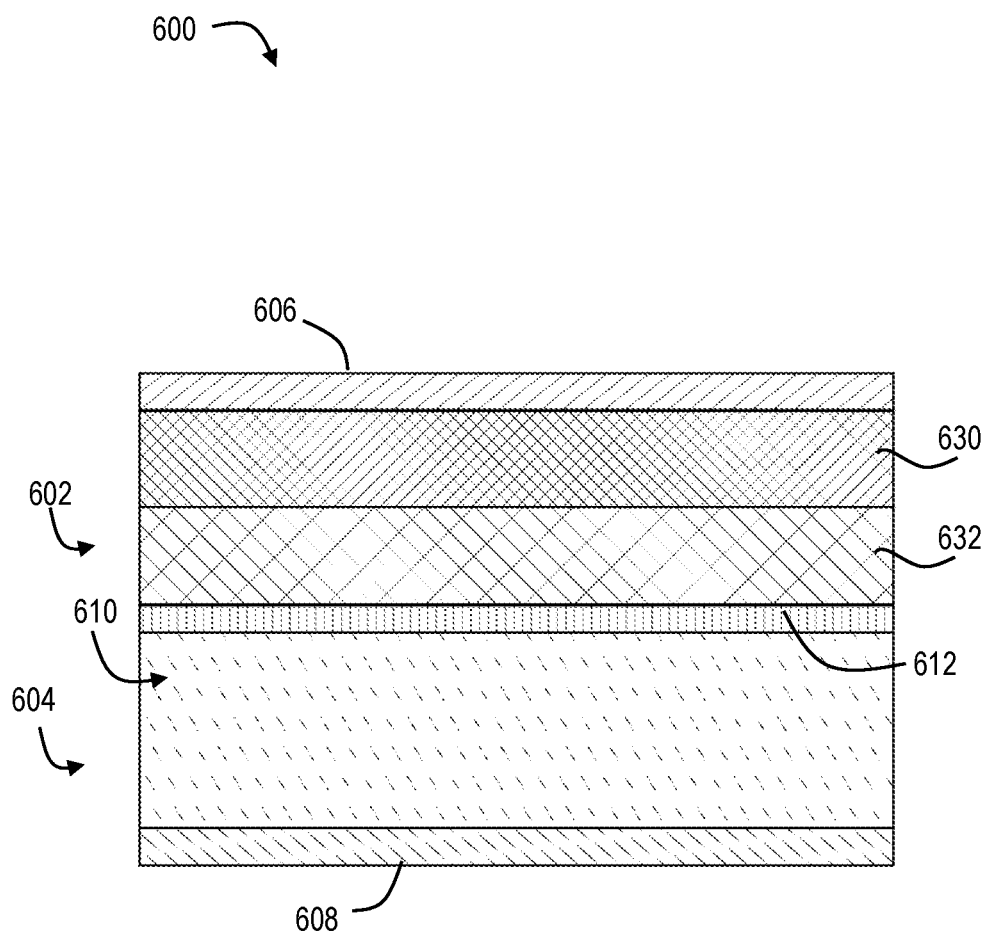
FIG. 6 is a schematic sectional view of another illustrative electrochemical cell having one multilayered electrode and one homogeneous electrode, in accordance with aspects of the present disclosure.

FIG. 6 is a schematic sectional view of an illustrative electrochemical cell 600 having a multilayered cathode 602 and a homogeneous anode 604. Electrochemical cell 600 is an example of electrochemical cell 100 of FIG. 1, and cathode 602 is an example of electrode 202 of FIG. 2. Cell 600 includes a separator 612, an electrolyte 610, and current collectors 606 and 608. Electrolyte 610 enables the transport of ions between the electrodes, and a liquid permeable polymer separator 612 separates and electronically insulates the electrodes from each other.

Homogeneous anode 604 includes a single layer adjacent to current collector 608 and separator 612. Anode 604 is coated on current collector 608 in such a way that all parts of the electrode are substantially similar in terms of their chemistry (e.g., of active material particles, binder, conductive additive, etc.), and microstructure (e.g., of active mass fraction, porosity, tortuosity, etc.) within the volume of the electrode composite. Anode 604 may be substantially planar, with thicknesses measured relative to a direction perpendicular to current collector 608.

As mentioned above, multilayer cathode 602 is an example of the electrode 202. Accordingly, the components and characteristics of cathode 602 are substantially identical to corresponding components and characteristics of electrode 202. Multilayer cathode 602 includes a first layer 630 and a second layer 632. First layer 630 is adjacent to current collector 606, and second layer 632 is located adjacent (intermediate) the first layer and separator 612. First layer 630 and second layer 632 each may be substantially planar, with thicknesses measured relative to a direction perpendicular to current collector 606.

First layer 630 includes first active material particles and second layer 632 includes second active material particles. In some examples, first active material of first layer 630 has a greater active volume fraction and/or active mass fraction than active material of second layer 632. In some examples, active material of first layer 630 has a lower active volume fraction and/or active mass fraction than active material of second layer 632.

Characteristics regarding material composition and size distributions of the layers of cathode 602 are substantially as described with respect to electrode 202. Subsequently, a free energy to lithiate the first active material of first layer 630 may be lower than a free energy to lithiate the second active material of second layer 632. Furthermore, a solid state diffusivity of the first active material of first layer 630 may be greater than a solid state diffusivity of the second active material of second layer 632.

Figure 7:
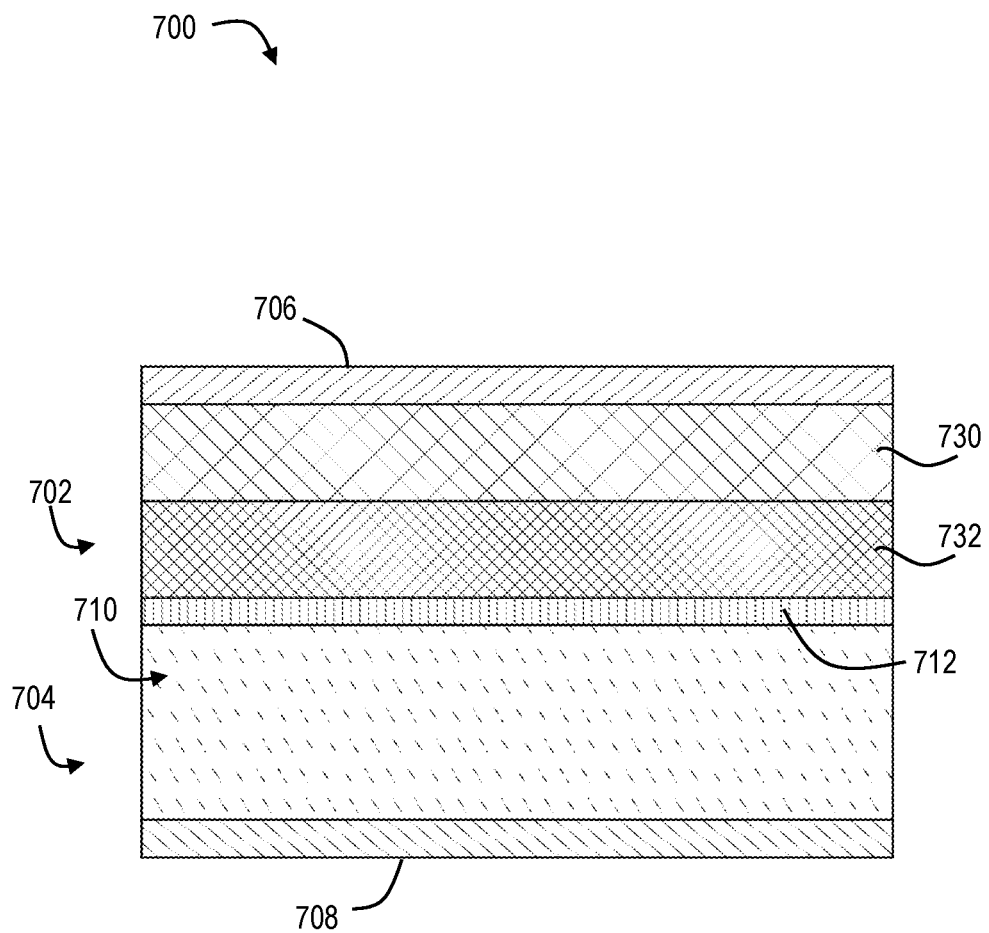
FIG. 7 is a schematic sectional view of another illustrative electrochemical cell having one multilayered electrode and one homogeneous electrode, in accordance with aspects of the present disclosure.

FIG. 7 is a schematic sectional view of an illustrative electrochemical cell 700 having a multilayered cathode 702 and a homogeneous anode 704. Electrochemical cell 700 is an example of electrochemical cell 100 of FIG. 1, and cathode 702 is an example of electrode 302 of FIG. 3. Cell 700 includes a separator 712, an electrolyte 710, and current collectors 706 and 708. Electrolyte 710 enables the transport of ions between the electrodes, and a liquid permeable polymer separator 712 separates and electronically insulates the electrodes from each other.

Homogeneous anode 704 includes a single layer adjacent to current collector 708 and separator 712. Anode 704 is coated on current collector 708 in such a way that all parts of the electrode are substantially similar in terms of their chemistry (e.g., of active material particles, binder, conductive additive, etc.), and microstructure (e.g., of active mass fraction, porosity, tortuosity, etc.) within the volume of the electrode composite. Anode 704 may be substantially planar, with thicknesses measured relative to a direction perpendicular to current collector 708.

As mentioned above, multilayer cathode 702 is an example of electrode 302. Accordingly, the components and characteristics of cathode 702 are substantially identical to corresponding components and characteristics of electrode 302. Multilayer cathode 702 includes a first layer 730 and a second layer 732. First layer 730 in the present example is adjacent to current collector 706, and second layer 732 is located adjacent (intermediate) the first layer and separator 712. First layer 730 and second layer 732 may be substantially planar, with thicknesses measured relative to a direction perpendicular to current collector 706.

In the present embodiment, first layer 730 includes first active material particles and the second layer 732 includes second active material particles. In one example, first active material of the first layer 730 has a greater active volume fraction and/or active mass fraction than active material of the second layer 732. In another example, active material of the first layer 730 has a lower active volume fraction and/or active mass fraction than active material of the second layer 732.

Characteristics regarding material composition and size distributions of the layers of cathode 702 are substantially as described with respect to electrode 302. Subsequently, a free energy to delithiate the first active material of first layer 730 may be greater than a free energy to delithiate the second active material of second layer 732. Additionally, in this way a solid state diffusivity of the first active material of first layer 730 may be less than a solid state diffusivity of the second active material of second layer 732.

C. Illustrative Cells Having Two Multilayer Electrodes

As shown in FIGS. 8-12, this section describes several illustrative electrochemical cells wherein both electrodes have multiple layers configured to provide substantive advantages over known cell designs.

Figure 8:
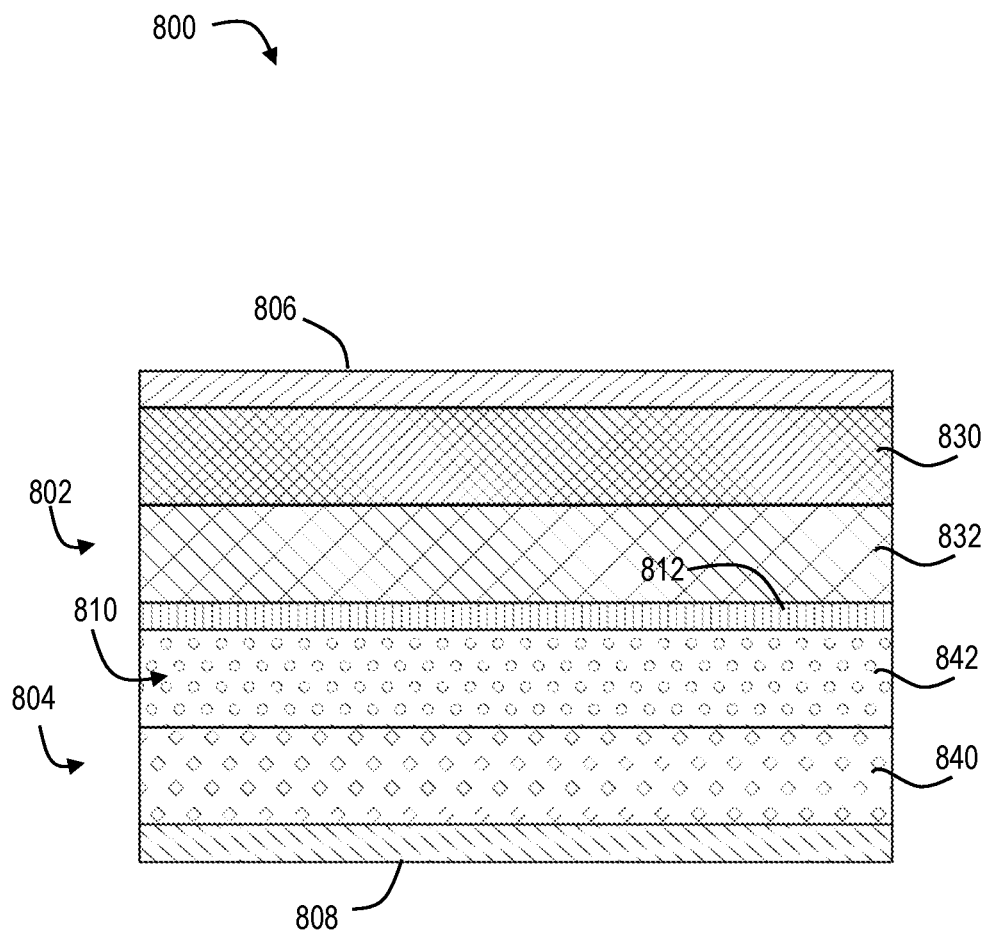
FIG. 8 is a schematic sectional view of an illustrative electrochemical cell having two multilayered electrodes, in accordance with aspects of the present disclosure.

FIG. 8 is a schematic sectional view of an illustrative electrochemical cell 800 having a multilayered cathode 802 and a multilayered anode 804. Electrochemical cell 800 is an example of electrochemical cell 100 of FIG. 1, and cathode 802 and anode 804 are both examples of electrode 202 of FIG. 2. Cell 800 includes a separator 812, an electrolyte 810, and current collectors 806 and 808. Electrolyte 810 enables the transport of ions between the electrodes, and a liquid permeable polymer separator 812 separates and electronically insulates the electrodes from each other.

As mentioned above, multilayer cathode 802 and multilayer anode 804 are each an example of electrode 202. Accordingly, the components and characteristics of cathode 802 and anode 804 are substantially identical to corresponding elements and characteristics described above with respect to electrode 202.

Cathode 802 includes a first layer 830 and a second layer 832. First layer 830 is adjacent current collector 806, and second layer 832 is located adjacent (intermediate) the first layer and separator 812. First layer 830 and second layer 832 each may be substantially planar, with thicknesses measured relative to a direction perpendicular to current collector 806.

First layer 830 includes first active material particles and second layer 832 includes second active material particles. In some examples, first active material of first layer 830 has a greater active volume fraction and/or active mass fraction than active material of second layer 832. In some examples, active material of first layer 830 has a lower active volume fraction and/or active mass fraction than active material of second layer 832.

Characteristics regarding material composition and size distributions of the layers of cathode 802 are substantially as described with respect to electrode 202. Subsequently, a free energy to lithiate the first active material of first layer 830 may be lower than a free energy to lithiate the second active material of second layer 832. Furthermore, a solid state diffusivity of the first active material of first layer 830 may be greater than a solid state diffusivity of the second active material of second layer 832.

Anode 804 includes a first layer 840 and a second layer 842. First layer 840 is adjacent current collector 808, and second layer 842 is adjacent (intermediate) the first layer and separator 812. First layer 840 and second layer 842 each may be substantially planar, with thicknesses measured relative to a direction perpendicular to the current collector 808.

First layer 840 includes first active material particles and second layer 842 includes second active material particles. In some examples, first active material of first layer 840 has a greater active volume fraction and/or active mass fraction than active material of second layer 842. In some examples, active material of first layer 840 has a lower active volume fraction and/or active mass fraction than active material of second layer 842.

Characteristics regarding material composition and size distributions of the layers of anode 804 are substantially as described with respect to electrode 202. Subsequently, a free energy to lithiate the first active material of first layer 840 may be lower than a free energy to lithiate the second active material of second layer 842. Furthermore, a solid state diffusivity of the first active material of first layer 840 may be greater than a solid state diffusivity of the second active material of second layer 842.

Figure 9:
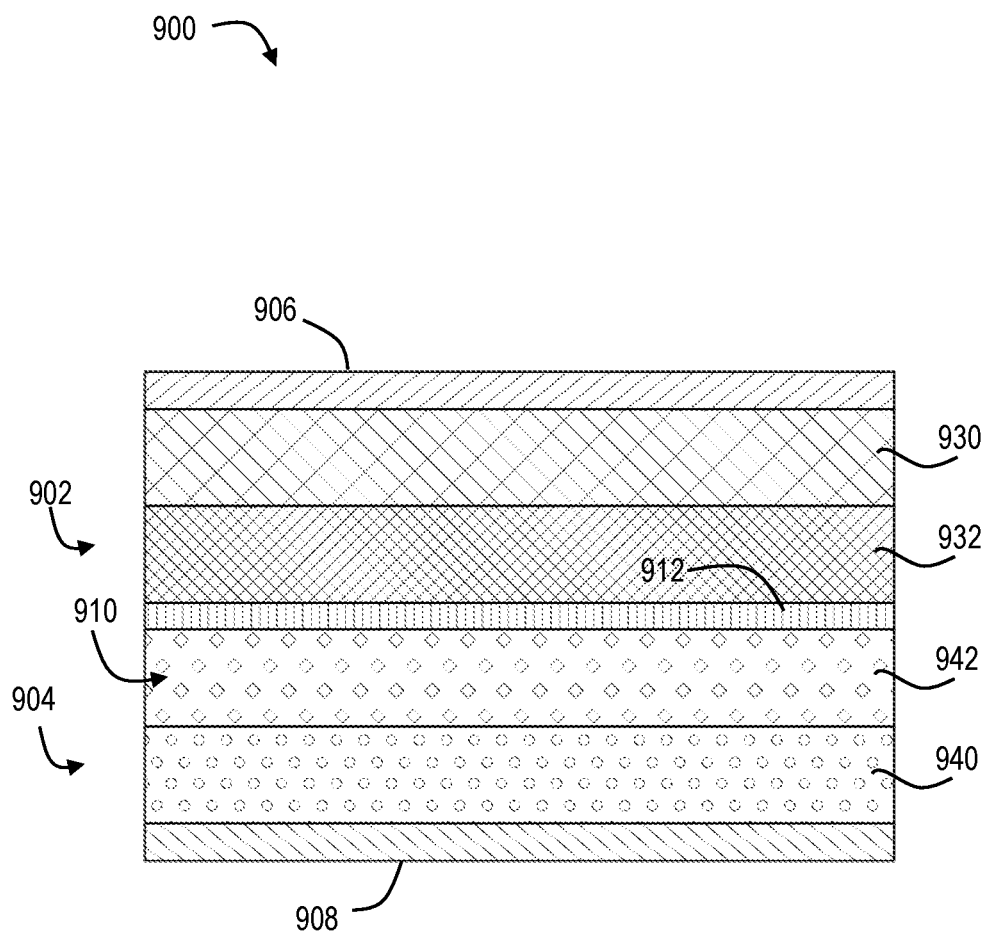
FIG. 9 is a schematic sectional view of another illustrative electrochemical cell having two multilayered electrodes, in accordance with aspects of the present disclosure.

FIG. 9 is a schematic sectional view of an illustrative electrochemical cell 900 having a multilayered cathode 902 and a multilayered anode 904. Electrochemical cell 900 is an example of electrochemical cell 100 of FIG. 1, and cathode 902 and anode 904 are both examples of electrode 302 of FIG. 3. Cell 900 includes a separator 912, an electrolyte 910, and current collectors 906 and 908. Electrolyte 910 enables the transport of ions between the electrodes, and a liquid permeable polymer separator 912 separates and electronically insulates the electrodes from each other.

As mentioned above, multilayer cathode 902 and multilayer anode 904 are each an example of electrode 302. Accordingly, the components and characteristics of cathode 902 and anode 904 are substantially identical to corresponding elements and characteristics described above with respect to electrode 302.

Cathode 902 includes a first layer 930 and a second layer 932. First layer 930 is adjacent current collector 906, and second layer 932 is adjacent (intermediate) the first layer and separator 912. First layer 930 and second layer 932 each may be substantially planar, with thicknesses measured relative to a direction perpendicular to current collector 906.

First layer 930 includes first active material particles and second layer 932 includes second active material particles. In some examples, first active material of first layer 930 has a greater active volume fraction and/or active mass fraction than active material of second layer 932. In some examples, active material of first layer 930 has a lower active volume fraction and/or active mass fraction than active material of second layer 932.

Characteristics regarding material composition and size distributions of the layers of cathode 902 are substantially as described with respect to electrode 302. Subsequently, a free energy to delithiate the first active material of first layer 930 may be greater than a free energy to delithiate the second active material of second layer 932. Furthermore, a solid state diffusivity of the first active material of first layer 930 may be less than a solid state diffusivity of the second active material of second layer 932.

Anode 904 includes a first layer 940 and a second layer 942. First layer 940 is adjacent current collector 908, and second layer 942 is adjacent (intermediate) the first layer and separator 912. First layer 940 and second layer 942 each may be substantially planar, with thicknesses measured relative to a direction perpendicular to current collector 908.

First layer 940 includes first active material particles and second layer 942 includes second active material particles. In some examples, first active material of first layer 940 has a greater active volume fraction and/or active mass fraction than active material of second layer 942. In some examples, active material of first layer 940 has a lower active volume fraction and/or active mass fraction than active material of second layer 942.

Characteristics regarding material composition and size distributions of the layers of anode 904 are substantially as described with respect to electrode 302. Subsequently, a free energy to delithiate the first active material of first layer 940 may be greater than a free energy to delithiate the second active material of second layer 942. Furthermore, a solid state diffusivity of the first active material of first layer 940 may be less than a solid state diffusivity of the second active material of second layer 942.

Figure 10:
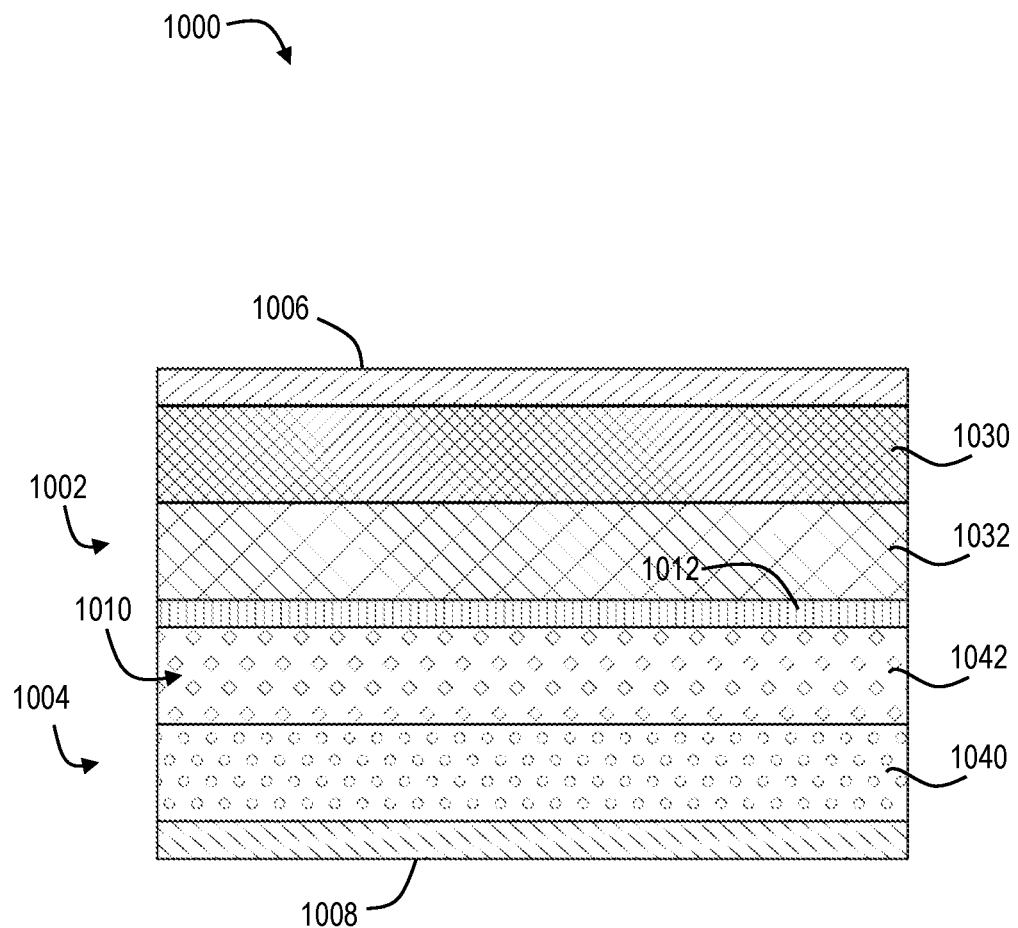
FIG. 10 is a schematic sectional view of another illustrative electrochemical cell having two multilayered electrodes, in accordance with aspects of the present disclosure.

FIG. 10 is a schematic sectional view of an illustrative electrochemical cell 1000 having a multilayered cathode 1002 and a multilayered anode 1004. Electrochemical cell 1000 is an example of electrochemical cell 100 of FIG. 1, multilayer cathode 1002 is an example of electrode 202 of FIG. 2, and multilayer anode 1004 is an example of electrode 302 of FIG. 3. Cell 1000 includes a separator 1012, an electrolyte 1010, and current collectors 1006 and 1008. Electrolyte 1010 enables the transport of ions between electrodes, and a liquid permeable polymer separator 1012 separates and electronically insulates the electrodes from each other.

As mentioned above, multilayer cathode 1002 is an example of electrode 202, and multilayer anode 1004 is an example of electrode 302. Accordingly, the components and characteristics of cathode 1002 are substantially identical to corresponding elements and characteristics described above with respect to electrode 202, and the components and characteristics of anode 1004 are substantially identical to corresponding elements and characteristics described above with respect to electrode 302.

Cathode 1002 includes a first layer 1030 and a second layer 1032. First layer 1030 is adjacent current collector 1006, and second layer 1032 is adjacent (intermediate) the first layer and separator 1012. First layer 1030 and second layer 1032 each may be substantially planar, with thicknesses measured relative to a direction perpendicular to current collector 1006.

First layer 1030 includes first active material particles and second layer 1032 includes second active material particles. In some examples, first active material of first layer 1030 has a greater active volume fraction and/or active mass fraction than active material of second layer 1032. In some examples, active material of first layer 1030 has a lower active volume fraction and/or active mass fraction than active material of second layer 1032.

Characteristics regarding material composition and size distributions of the layers of cathode 1002 are substantially as described with respect to electrode 202. Subsequently, a free energy to lithiate the first active material of first layer 1030 may be lower than a free energy to lithiate the second active material of second layer 1032. Furthermore, a solid state diffusivity of the first active material of first layer 1030 may be greater than a solid state diffusivity of the second active material of second layer 1032.

Anode 1004 includes a first layer 1040 and a second layer 1042. First layer 1040 is adjacent current collector 1008, and second layer 1042 is adjacent (intermediate) the first layer and separator 1012. First layer 1040 and second layer 1042 each may be substantially planar, with thicknesses measured relative to a direction perpendicular to current collector 1008.

First layer 1040 includes first active material particles and second layer 1042 includes second active material particles. In some examples, first active material of first layer 1040 has a greater active volume fraction and/or active mass fraction than active material of second layer 1042. In some examples, active material of first layer 1040 has a lower active volume fraction and/or active mass fraction than active material of second layer 1042.

Characteristics regarding material composition and size distributions of the layers of anode 1004 are substantially as described with respect to electrode 302. Subsequently, a free energy to delithiate the first active material of first layer 1040 may be greater than a free energy to delithiate the second active material of second layer 1042. Furthermore, a solid state diffusivity of the first active material of first layer 1040 may be less than a solid state diffusivity of the second active material of second layer 1042.

Figure 11:
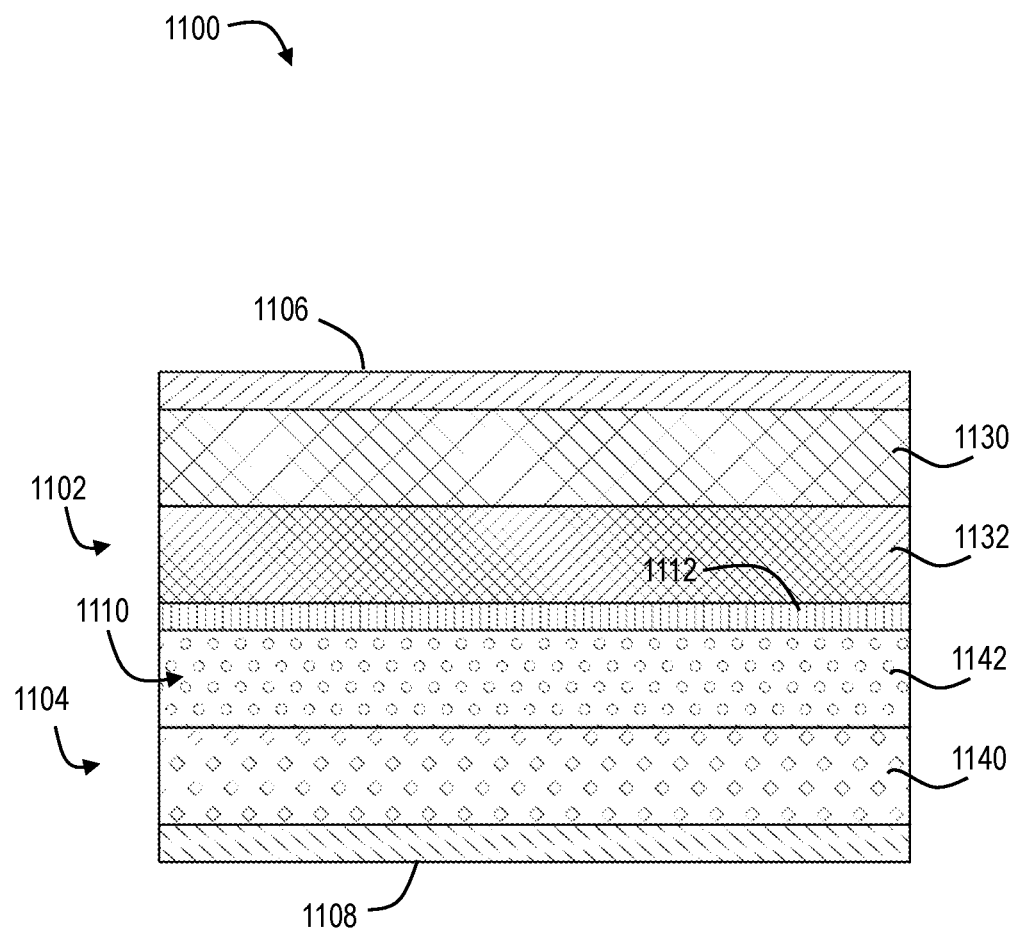
FIG. 11 is a schematic sectional view of another illustrative electrochemical cell having two multilayered electrodes, in accordance with aspects of the present disclosure.

FIG. 11 is a schematic sectional view of an illustrative electrochemical cell 1100 having a multilayered cathode 1102 and a multilayered anode 1104. Electrochemical cell 1100 is an example of electrochemical cell 100 of FIG. 1, multilayer cathode 1102 is an example of electrode 302 of FIG. 3, and multilayer anode 1104 is an example of electrode 202 of FIG. 2. Cell 1100 includes a separator 1112, an electrolyte 1110, and current collectors 1106 and 1108. Electrolyte 1110 enables the transport of ions between the electrodes, and a liquid permeable polymer separator 1112 separates and electronically insulates the electrodes from each other.

As mentioned above, multilayer cathode 1102 is an example of electrode 302, and multilayer anode 1104 is an example of electrode 202. Accordingly, the components and characteristics of cathode 1102 are substantially identical to corresponding elements and characteristics described above with respect to electrode 302, and the components and characteristics of anode 1104 are substantially identical to corresponding elements and characteristics described above with respect to electrode 202.

Cathode 1102 includes a first layer 1130 and a second layer 1132. First layer 1130 is adjacent to current collector 1106, and second layer 1132 is adjacent (intermediate) the first layer and separator 1112. First layer 1130 and second layer 1132 each may be substantially planar, with thicknesses measured relative to a direction perpendicular to current collector 1106.

First layer 1130 includes first active material particles and second layer 1132 includes second active material particles. In some examples, the first active material of first layer 1130 has a greater active volume fraction and/or active mass fraction than active material of second layer 1132. In some examples, the active material of first layer 1130 has a lower active volume fraction and/or active mass fraction than active material of second layer 1132.

Characteristics regarding material composition and size distributions of the layers of cathode 1102 are substantially as described with respect to electrode 302. Subsequently, a free energy to delithiate the first active material of first layer 1130 may be greater than a free energy to delithiate the second active material of second layer 1132. Furthermore, a solid state diffusivity of the first active material of first layer 1130 may be less than a solid state diffusivity of the second active material of second layer 1132.

Anode 1104 includes a first layer 1140 and a second layer 1142. First layer 1140 is adjacent to current collector 1108, and second layer 1142 is adjacent (intermediate) the first layer and separator 1112. First layer 1140 and second layer 1142 each may be substantially planar, with thicknesses measured relative to a direction perpendicular to current collector 1108.

First layer 1140 includes first active material particles and second layer 1142 includes second active material particles. In some examples, the first active material of first layer 1140 has a greater active volume fraction and/or active mass fraction than the active material of second layer 1142. In some examples, the active material of first layer 1140 has a lower active volume fraction and/or active mass fraction than active material of the second layer 1142.

Characteristics regarding material composition and size distributions of the layers of anode 1104 are substantially as described with respect to electrode 202. Subsequently, a free energy to lithiate the first active material of first layer 1140 may be lower than a free energy to lithiate the second active material of second layer 1142. Furthermore, a solid state diffusivity of the first active material of first layer 1140 may be greater than a solid state diffusivity of the second active material of second layer 1142.

Figure 12:
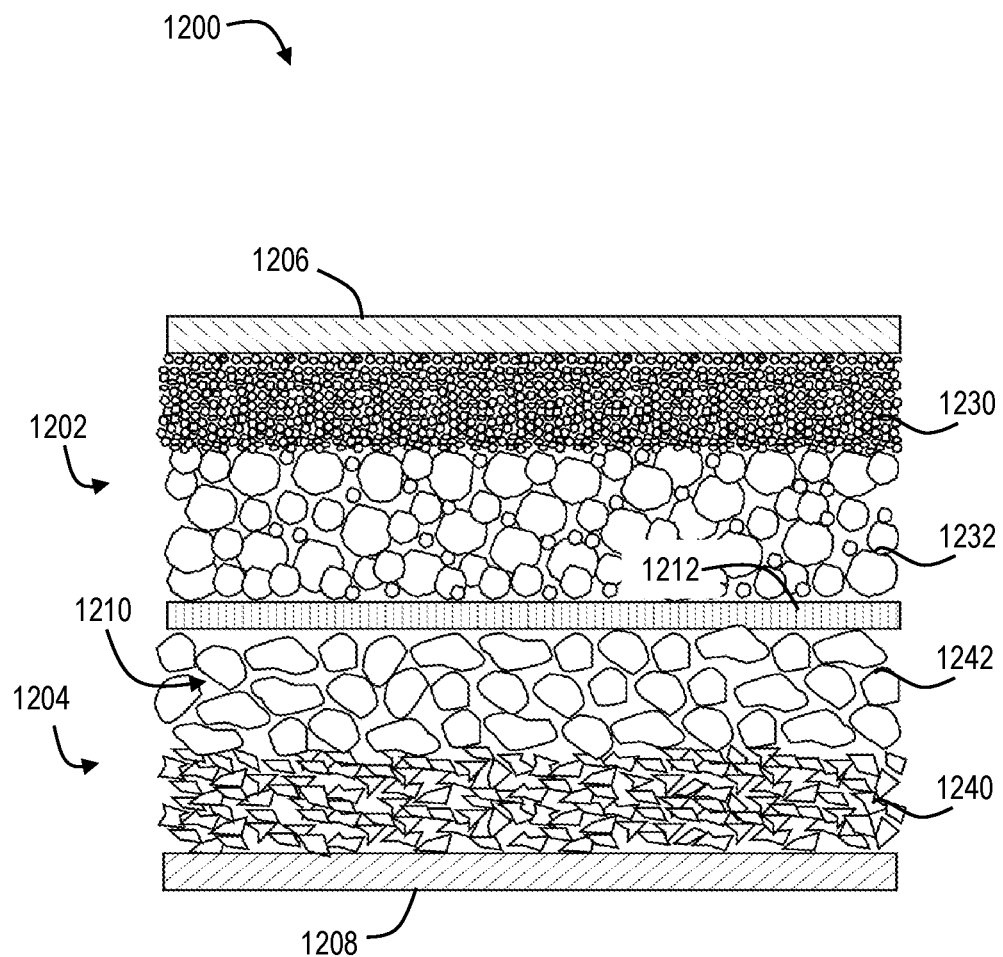
FIG. 12 is an illustrative sectional view of another illustrative electrochemical cell having two multilayered electrodes, in accordance with aspects of the present disclosure.

FIG. 12 is a schematic sectional view of an illustrative electrochemical cell 1200 having a multilayered cathode 1202 and a multilayered anode 1204. Electrochemical cell 1200 is an example of electrochemical cell 100 of FIG. 1, cathode 1202 is an example of electrode 302 of FIG. 3, and anode 1204 is an example of electrode 202 of FIG. 2. Cell 1200 is also an example of electrochemical cell 1100 of FIG. 11 (see above). Cell 1200 includes a separator 1212, an electrolyte 1210, and current collectors 1206 and 1208. Electrolyte 1210 enables the transport of ions between the electrodes, and a liquid permeable polymer separator 1212 separates and electronically insulates the electrodes from each other.

As mentioned above, multilayer cathode 1202 is an example of electrode 302, and multilayer anode 1204 is an example of electrode 202. Accordingly, the components and characteristics of cathode 1202 are substantially identical to corresponding elements and characteristics described above with respect to electrode 302, and the components and characteristics of anode 1204 are substantially identical to corresponding elements and characteristics described above with respect to electrode 202.

Cathode 1202 includes a first layer 1230 and a second layer 1232. First layer 1230 is adjacent current collector 1206, and second layer 1232 is adjacent (intermediate) the first layer and separator 1212. First layer 1230 and second layer 1232 each may be substantially planar, with thicknesses measured relative to a direction perpendicular to current collector 1206.

First layer 1230 includes first active material particles and second layer 1232 includes second active material particles. In the present example, first active material of first layer 1230 has a smaller active volume fraction and/or active mass fraction than active material of the second layer 1232. Additionally, the first active material particles of first layer 1230 have a first distribution of sizes smaller than a second distribution of sizes of the second active material particles of second layer 1232. The first distribution may be smaller than the second distribution by having a median particle size smaller than a median particle size of the second distribution.

In this example, the first active material of first layer 1230 consists essentially of LMO and the second active material of second layer 1232 consists essentially of NMC. Accordingly, a free energy to delithiate the first active material of first layer 1230 (at ~3.9 V vs. Li/Li+) is greater than a free energy to delithiate the second active material of second layer 1232 (at ~3.8 V vs. Li/Li+). Additionally, a solid state diffusivity of the first active material of first layer 1230 is greater than a solid state diffusivity of the second active material of second layer 1232.

Anode 1204 includes a first layer 1240 and a second layer 1242. First layer 1240 is adjacent current collector 1208, and second layer 1242 is adjacent (intermediate) the first layer and separator 1212. First layer 1240 and second layer 1242 each may be substantially planar, with thicknesses measured relative to a direction perpendicular to current collector 1208.

First layer 1240 includes first active material particles and second layer 1242 includes second active material particles. In the present example, first active material of first layer 1240 has an active volume fraction approximately equal to the active volume fraction of the active material of second layer 1242. Additionally, the first active material particles of first layer 1240 have a first distribution of sizes smaller than a second distribution of sizes of the second active material particles of second layer 1242.

In this example, the first active material of first layer 1240 includes one or more of a hard carbon (e.g., a non-graphitic carbon) and silicon monoxide, and the second active material of second layer 1242 includes graphitic carbons. Accordingly, a free energy to lithiate the first active material of first layer 1240 is lower than a free energy to lithiate the second active material of second layer 1242. Furthermore, a solid state diffusivity of the first active material of first layer 1240 is greater than a solid state diffusivity of the second active material of second layer 1242.

D. Illustrative Method and Device for Manufacturing Multilayered Electrodes

Figure 13:
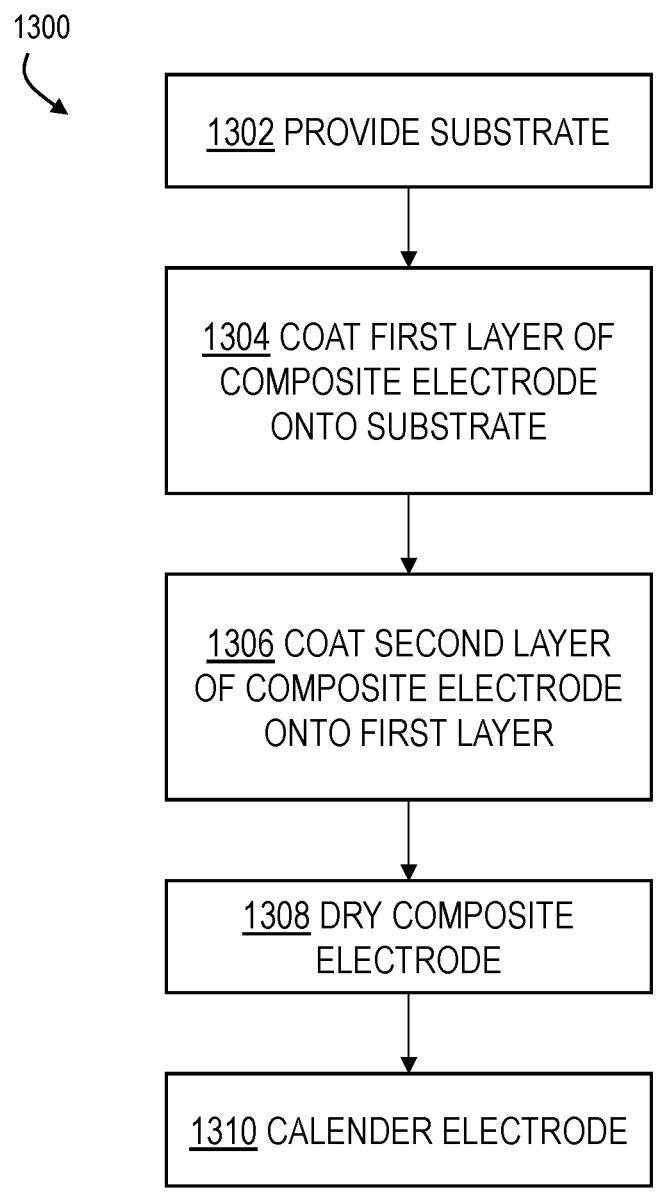
FIG. 13 is a flow chart depicting steps of an illustrative method for manufacturing electrodes and electrochemical cells of the present disclosure.
Figure 14:
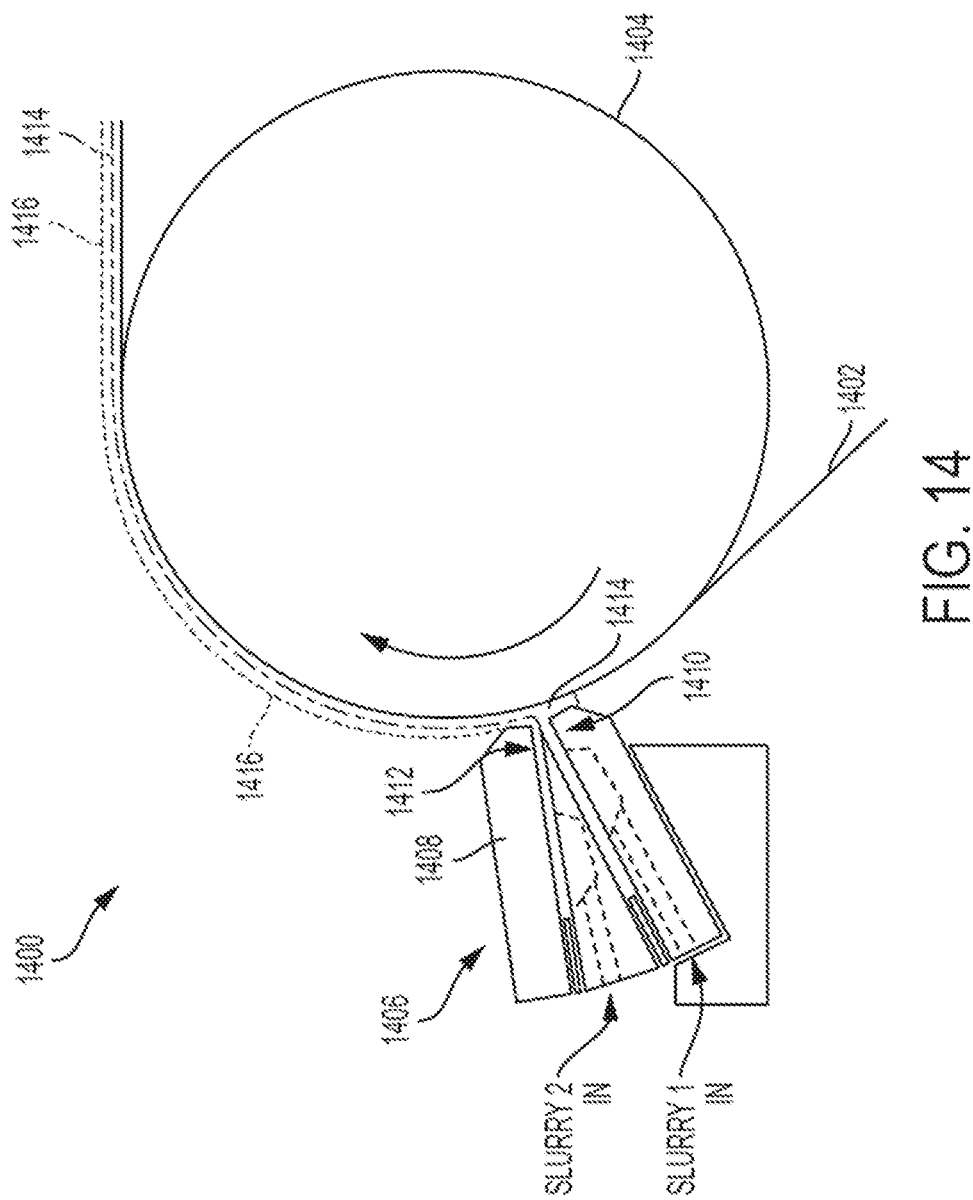
FIG. 14 is a schematic diagram of an illustrative manufacturing system suitable for carrying out steps of the manufacturing method of FIG. 13.

This section describes steps of an illustrative method 1300 for forming an electrode including multiple layers; see FIGS. 13-14.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

FIG. 13 is a flowchart illustrating steps performed in an illustrative method, and may not recite the complete process or all steps of the method. Although various steps of method 1300 are described below and depicted in FIG. 13, the steps need not necessarily all be performed, and in some cases may be performed simultaneously, or in a different order than the order shown.

Step 1302 of method 1300 includes providing a substrate. In some examples, the substrate comprises a current collector, such as current collectors 206, 306 (and others) described above. In some examples, the substrate comprises a metal foil.

Method 1300 next includes a plurality of steps in which at least a portion of the substrate is coated with an active material composite. This may be done by causing the substrate to move past an active material composite dispenser (or vice versa) that coats the substrate as described below. The composition of active material particles in each active material composite layer may be selected to achieve the benefits, characteristics, and results described herein.

Step 1304 of method 1300 includes coating a first layer of a composite electrode on a first side of the substrate. In some examples, the first layer may include a plurality of first particles adhered together by a first binder, the first particles having a first average particle size (or other first particle distribution).

The coating process of step 1304 may include any suitable coating method(s), such as slot die, blade coating, spray-based coating, electrostatic jet coating, or the like.

In some examples, the first layer is coated as a wet slurry of solvent, e.g., water or NMP(N-Methyl-2-pyrrolidone), binder, conductive additive, and active material. In some examples, the first layer is coated dry, as an active material with a binder and/or a conductive additive. Step 1304 may optionally include drying the first layer of the composite electrode.

Step 1306 of method 1300 includes coating a second layer of a composite electrode, on the first side of the substrate, onto the first layer, forming a multilayered (e.g., stratified) structure. The second layer may include a plurality of second particles adhered together by a second binder, the second particles having a second average particle size (or other second particle distribution).

In some examples, steps 1304 and 1306 may be performed substantially simultaneously. For example, both of the active material slurries may be extruded through their respective orifices simultaneously. This forms a two-layer slurry bead and coating on the moving substrate. In some examples, difference in viscosities, difference in surface tensions, difference in densities, difference in solids contents, and/or different solvents used between the first active material slurry and the second active material slurry may be tailored to cause interpenetrating finger structures at the boundary between the two active material composite layers. In some embodiments, the viscosities, surface tensions, densities, solids contents, and/or solvents may be substantially similar. Creation of interpenetrating structures may be facilitated by turbulent flow at the wet interface between the first active material electrode slurry and the second active material electrode slurry, creating partial intermixing of the two active material electrode slurries.

To ensure proper curing in the drying process, the first layer (closest to the current collector) may be configured to be dried from solvent prior to the second layer (further from the current collector) so as to avoid creating skin-over effects and blisters in the resulting dried coatings.

Method 1300 may optionally include drying the composite electrode in step 1308, and/or calendering the composite electrode in step 1310. In these optional steps, both the first and second layers may experience the drying process and the calendering process as a combined structure. In some examples, steps 1308 and 1310 may be combined (e.g., in a hot roll process). In some examples, drying step 1308 includes a form of heating and energy transport to and from the electrode (e.g., convection, conduction, radiation) to expedite the drying process. In some examples, calendering step 1310 is replaced with another compression, pressing, or compaction process. In some examples, calendering the electrode may be performed by pressing the combined first and second layers against the substrate, such that electrode density is increased in a non-uniform manner, with the first layer having a first porosity and the second layer having a lower second porosity.

Turning to FIG. 14, an illustrative system 1400 suitable for use with method 1300 will now be described. In some examples, a slot-die coating head with at least two fluid slots, fluid cavities, fluid lines, and fluid pumps may be used to manufacture a battery electrode featuring multiple active material composite layers. System 1400 includes a dual-cavity slot-die coating head configured to manufacture electrodes having two layers. In some examples, additional cavities may be used to create additional layers.

System 1400 is a manufacturing system in which a foil substrate 1402 (e.g., current collector substrate 206, 306, etc.) is transported by a revolving backing roll 1404 past a stationary dispenser device 1406. Dispenser device 1406 may include any suitable dispenser configured to evenly coat one or more layers of active material slurry onto the substrate, as described with respect to steps 1304 and 1306 of method 1300. In some examples, the substrate may be held stationary while the dispenser head moves. In some examples, both may be in motion.

Dispenser device 1406 may, for example, include a dual chamber slot die coating device having a coating head 1408 with two orifices 1410 and 1412. A slurry delivery system supplies two different active material slurries to the coating head under pressure. Due to the revolving nature of backing roll 1404, material exiting the lower orifice or slot 1410 will contact substrate 1402 before material exiting the upper orifice or slot 1412. Accordingly, a first layer 1414 will be applied to the substrate and a second layer 1416 will be applied on top of the first layer.

Accordingly, corresponding steps of method 1300 may be characterized as follows. Causing a current collector substrate and an active material composite dispenser to move relative to each other, and coating at least a portion of the substrate with an active material composite, using the dispenser. Coating, in this case, includes: applying a first layer of slurry to the substrate using a first orifice or slot of the dispenser, and applying a second layer of a different slurry to the first layer using a second orifice or slot of the dispenser.

E. Illustrative Electrochemical Cell Having Improved Capacity

Different anode active materials may have different associated battery capacities when included in an electrochemical cell. In some cases, this is due to active materials having differing rates of irreversible chemical reactions which occur between the anode active materials and lithium ions at first charge.

An increase in irreversible areal capacity in an anode corresponds with an increase in irreversible cathode capacity, as lithium ions provided by the cathode materials at first charge become irreversibly bound to anode active material particles. Anodes having high irreversible areal capacities may additionally or alternatively be described as high consumption anode active materials. Anodes and cathodes have certain first-cycle efficiencies, which correspond to a ratio between their reversible areal capacities and their irreversible areal capacities. Low capacity (e.g., low areal capacity) anodes may use up all lithium provided by cathode active materials at first cycle, resulting in little to no cycled lithium available for normal battery function. Active materials such as hard carbon may have a comparatively higher irreversible areal capacity when compared with other active materials, such as graphitic carbon.

Inclusion of high consumption anode active materials in an electrochemical cell may therefore be undesirable due to a corresponding increase in required cathode size. Cathode materials, especially in lithium-ion batteries, are increasingly expensive, and any increase in cathode size can significantly increase battery cost. However, high consumption active materials (e.g., hard carbon) may have other benefits, including high cycle life and high solid-state diffusivity. Pre-lithiating an electrochemical cell that includes high consumption anode active materials may reduce reversible capacity loss caused by high consumption active materials, thereby reducing the cost of cells including these materials.

Pre-lithiation is a process in which one or more methods are used to increase the amount of lithium ions within an electrochemical cell without increasing cathode size. Pre-lithiation provides an initial reservoir of lithium ions for the cell, which may be consumed by the anode at first charge, resulting in an increase in cycled lithium. The pre-lithiation process reduces the irreversible areal capacity of cathodes included in the electrochemical cell. The pre-lithiation process also increases the cathode's reversible areal capacity, relative to a cathode paired with a non-pre-lithiated, high consumption anode.

In some examples, pre-lithiation includes sprinkling an assembled electrochemical cell with stabilized lithium metal powder (SLMP). In some examples, pre-lithiation includes wrapping anodes in a lithium metal foil and submerging the anodes in a chemical or electrochemical bath. In some examples, pre-lithiation is a roll-to-roll process. The roll-to-roll process involves submerging anodes in a chemical or electrochemical bath of lithium salts. In some examples, an electrical field is applied to the submerged anodes (e.g., using field plates). Anodes processed using the roll-to-roll pre-lithiation process may subsequently be processed in a dry or inert environment.

Figure 15:
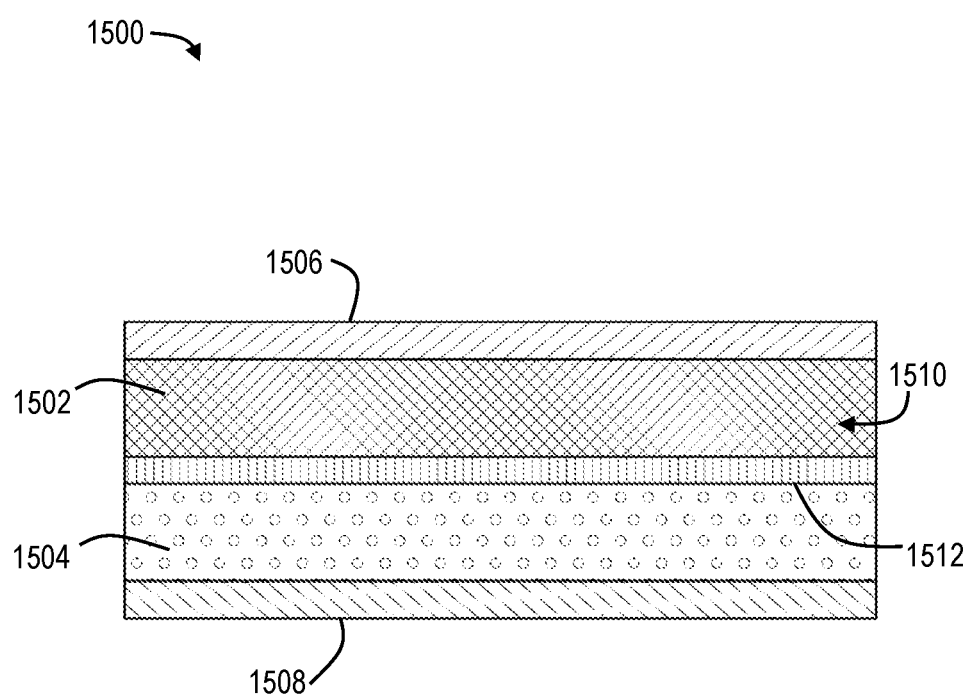
FIG. 15 is a schematic sectional view of an illustrative electrochemical cell.

FIG. 15 is a schematic sectional view of an illustrative electrochemical cell 1500 having a cathode 1502 and an anode 1504. Electrochemical cell 1500 may be an example of electrochemical cell 100 of FIG. 1, electrochemical cell 400 of FIG. 4, electrochemical cell 500 of FIG. 5, electrochemical cell 600 of FIG. 6, electrochemical cell 700 of FIG. 7, electrochemical cell 800 of FIG. 8, electrochemical cell 900 of FIG. 9, electrochemical cell 1000 of FIG. 10, electrochemical cell 1100 of FIG. 11, and/or electrochemical cell 1200 of FIG. 12. Cell 1500 includes a liquid permeable polymer separator 1512, an electrolyte 1510, and current collectors 1506 and 1508. Electrolyte 1510 enables the transport of ions between cathode 1502 and anode 1504, and separator 1512 separates and electronically insulates the electrodes from each other.

Cathode 1502 has one or more active material layers, which include a plurality of active material particles as described above with respect to cathode 102 of electrochemical cell 100. In some examples, cathode 1502 may be substantially identical to electrode 202 of FIG. 2. In some examples, cathode 1502 may be substantially identical to electrode 302 of FIG. 3. Anode 1504 includes one or more active material layers, which include a plurality of active material particles as described above with respect to anode 104 of electrochemical cell 100. In some examples, at least one active material layer of anode 1504 comprises hard carbon, silicon, silicon oxide, and/or any active materials having a relatively high voltage with respect to graphite. Hard carbon and silicon oxide are both well-suited for pre-lithiation. In some examples, anode 1504 may be substantially identical to electrode 202 of FIG. 2. In some examples, anode 1504 may be substantially identical to electrode 302 of FIG. 3.

Electrochemical cell 1500 is configured to have a specific ratio between the cell's full cell reversible areal capacity and the cell's cathode reversible areal capacity. Pre-lithiated electrochemical cells may have increased cathode reversible areal capacity when compared with the full cell reversible areal capacity, as a majority of capacity loss occurs in the anode without resulting cathode capacity loss. In some examples, the ratio between the full cell reversible areal capacity and the cathode reversible areal capacity is greater than or equal to 0.80. In some examples, the ratio between the full cell reversible areal capacity and the cathode reversible areal capacity is greater than or equal to 0.90. In some examples, electrochemical cell 1500 has been pre-lithiated so as to produce a desired ratio.

Figure 16:
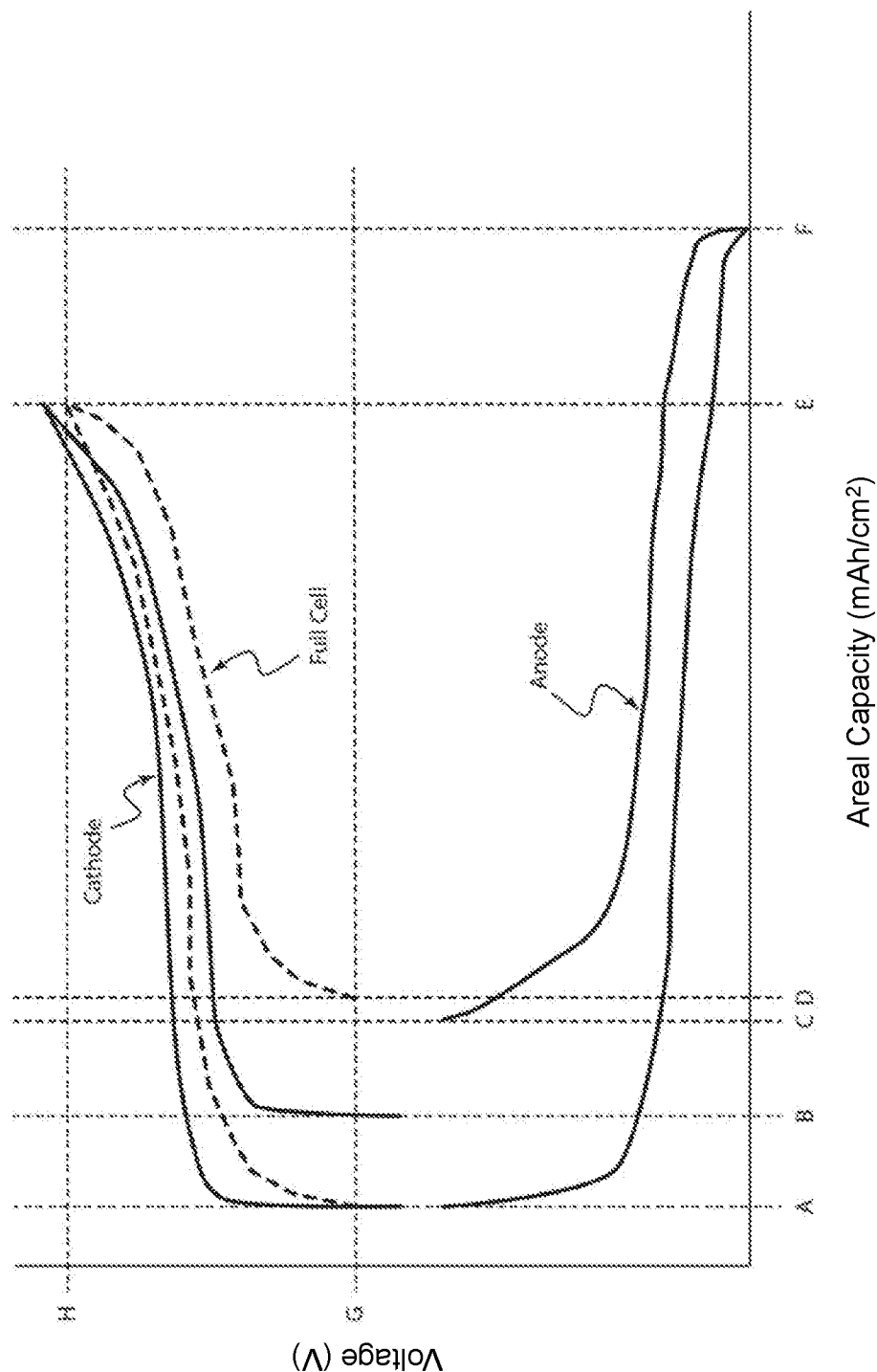
FIG. 16 is a charge-discharge curve of the electrochemical cell of FIG. 15 during a first charge-discharge cycle.

FIG. 16 shows a first cycle charge-discharge curve of the cell, with areal capacity shown on the x-axis and voltage shown on the y-axis. As can be seen in FIG. 16, cathode reversible areal capacity is larger than full cell reversible areal capacity in a pre-lithiated cell. The cathode (illustrated by the solid line at the top half of FIG. 16) has a reversible areal capacity (areal capacity from line E to line B) greater than its irreversible areal capacity (B-A). The cathode undergoes minimal capacity loss upon first charge in a pre-lithiated cell. The cathode reversible areal capacity is comparatively large when compared to the full cell (illustrated by the dashed line) reversible areal capacity (E-D). The full cell irreversible areal capacity (D-A) is larger than the cathode irreversible areal capacity (B-A), resulting in a full cell reversible areal capacity which is less than the cathode reversible areal capacity. As described above, the pre-lithiation process results in a ratio between the full cell reversible areal capacity and the cathode reversible areal capacity that may be greater than or equal to 0.80.

Figure 17:
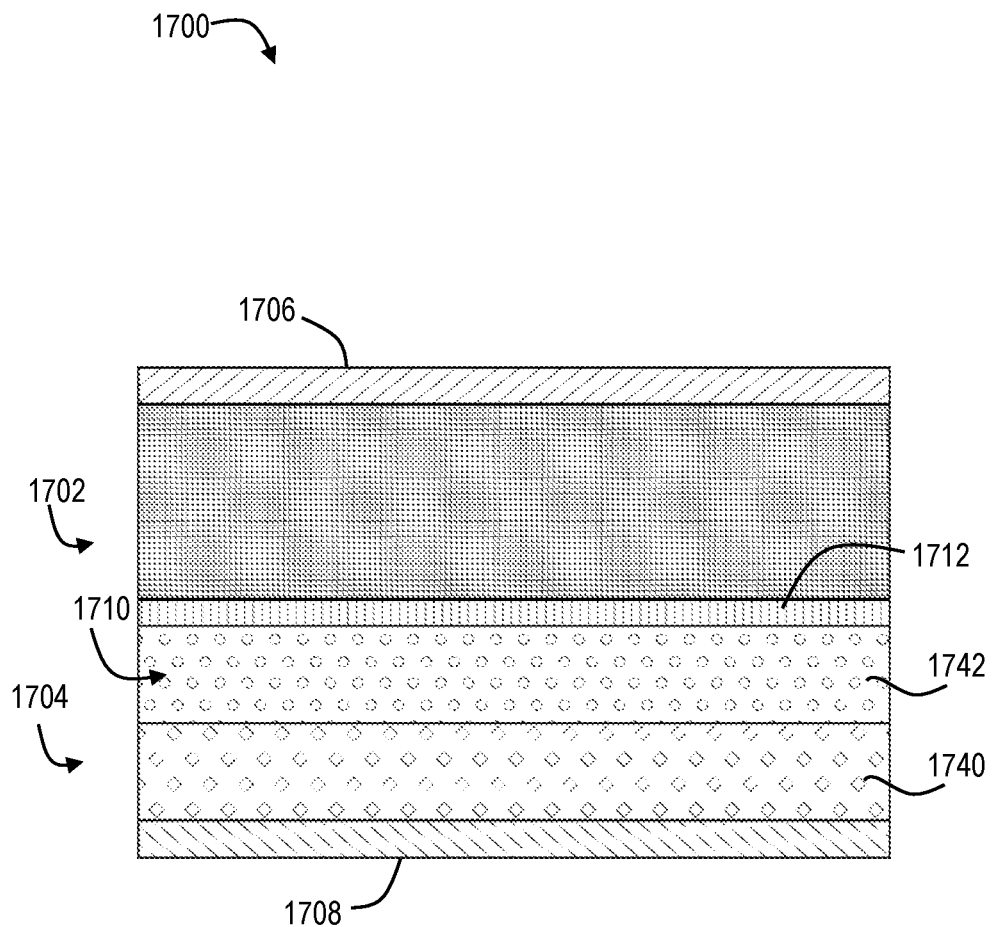
FIG. 17 is a schematic sectional view of an illustrative electrochemical cell having one multilayered electrode and one homogeneous electrode, in accordance with aspects of the present disclosure.

The anode (illustrated by the solid line at the bottom half FIG. 16) in a pre-lithiated cell has a comparatively high irreversible areal capacity (C-A) when compared with the cathode. This effect is due to irreversible reactions between anode active material particles and lithium ions provided by the pre-lithiation process. In a cell which has not undergone pre-lithiation, capacity loss due to anode reactions directly results in capacity loss in the cathode, as lithium ions are stripped from the cathode active materials. However, as anode active materials are less expensive and have higher energy densities when compared with cathode active materials, anode capacity loss does not result in large cost increases or cell capacity losses. Many electrochemical cells include excess anode capacity, having a N/P (AKA negative/positive) ratio greater than 1. In some examples, excess anode capacity (areal capacity between E and F) may be 1.05 times to 1.20 times larger than the full cell capacity (areal capacity between D and E). In some examples, electrochemical cells having improved capacity may include multilayered electrodes, as described above. FIG. 17 is a schematic sectional view of an illustrative electrochemical cell 1700 having a homogenous cathode 1702 and a multilayer anode 1704. Electrochemical cell 1700 is an example of electrochemical cell 100 of FIG. 1, and anode 1704 is an example of electrode 202 of FIG. 2. Cell 1700 includes a separator 1712, an electrolyte 1710, and current collectors 1706 and 1708. An electrolyte 1710 enables the transport of ions between cathode 1702 and anode 1704, and a liquid permeable polymer separator 1712 separates and electronically insulates the electrodes from each other.

Homogeneous cathode 1702 includes a single layer adjacent to current collector 1706 and separator 1712. Cathode 1702 is coated on current collector 1706 in such a way that all parts of the electrode are substantially similar in terms of their chemistry (e.g., of active material particles, binder, conductive additive, etc.), and microstructure (e.g., active mass fraction, porosity, tortuosity, etc.) within the volume of the electrode composite. Cathode 1702 may be substantially planar, with thicknesses measured relative to a direction perpendicular to current collector 1706. First layer 1740 and second layer 1742 each may be substantially planar, with thicknesses measured relative to a direction perpendicular to current collector 1708.

As mentioned above, multilayer anode 1704 is an example of electrode 202. Accordingly, the components and characteristics of anode 1704 are substantially identical to corresponding elements and characteristics described above with respect to electrode 202. Multilayer anode 1704 includes a first layer 1740 and a second layer 1742. First layer 1740 is adjacent to the current collector 1708, and second layer 1742 is disposed adjacent and intermediate the first layer and separator 1712.

First layer 1740 includes first active material particles and the second layer 1742 includes second active material particles. In some examples, first active material of the first layer 1740 has a greater active volume fraction and/or active mass fraction than active material of the second layer 1742. In some examples, active material of the first layer 1740 has a lower active volume fraction and/or active mass fraction than active material of the second layer 1742.

Electrochemical cell 1700 may be substantially similar to electrochemical cell 1500 with respect to pre-lithiation. Electrochemical cell 1700 is configured to have a specific ratio between the cell's full cell reversible areal capacity and the cell's cathode reversible areal capacity. In some examples, the ratio between the full cell reversible areal capacity and the cathode reversible areal capacity is greater than or equal to 0.80. In some examples, the ratio between the full cell reversible areal capacity and the cathode reversible areal capacity is greater than or equal to 0.90. In some examples, electrochemical cell 1700 has been pre-lithiated to produce a desired ratio.

Characteristics regarding material composition and size distributions of the layers of anode 1704 are substantially as described with respect to electrode 202. Subsequently, a free energy to lithiate the first active material of first layer 1740 may be lower than a free energy to lithiate the second active material of second layer 1742. Furthermore, a solid state diffusivity of the first active material of first layer 1740 may be greater than a solid state diffusivity of the second active material of second layer 1742.

Figure 18:
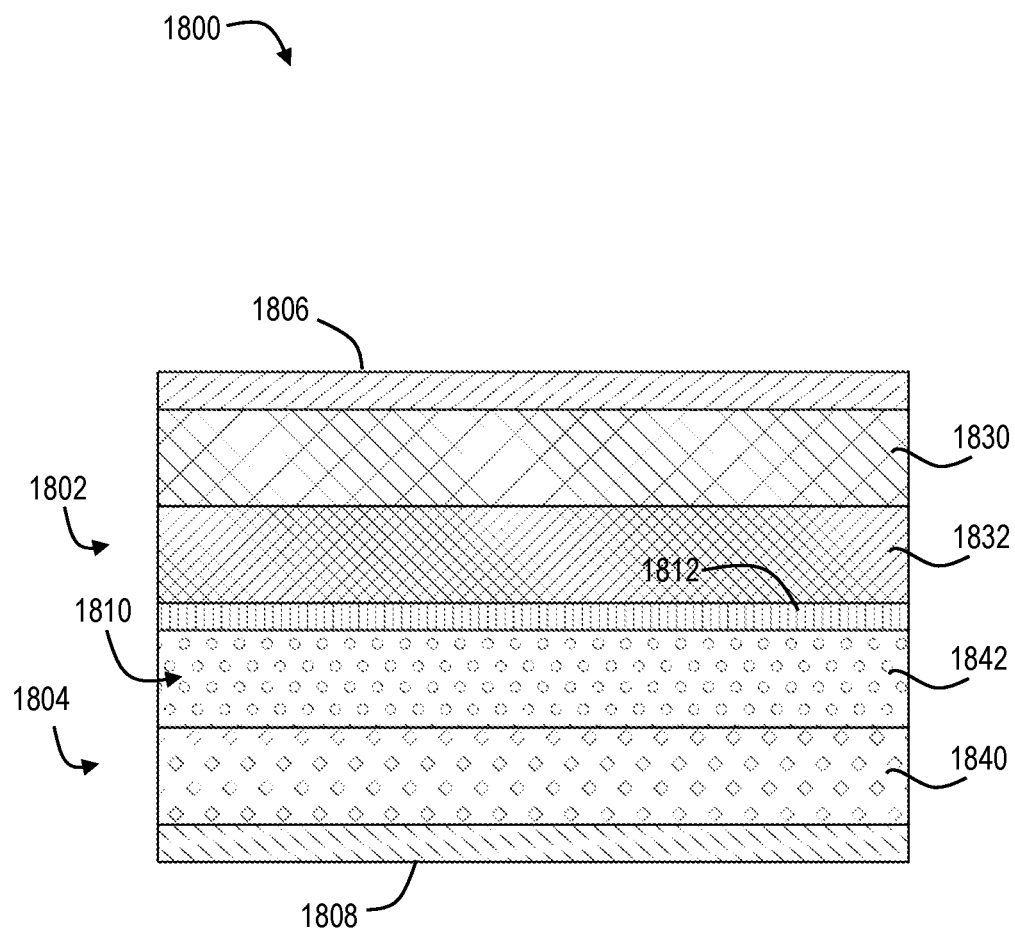
FIG. 18 is a schematic sectional view of an illustrative electrochemical cell having two multilayered electrodes, in accordance with aspects of the present disclosure.

In some examples, electrochemical cells having improved capacity may include a multilayered anode and a multilayered cathode. FIG. 18 is a schematic sectional view of an illustrative electrochemical cell 1800 having a multilayered cathode 1802 and a multilayered anode 1804. Electrochemical cell 1800 is an example of electrochemical cell 100 of FIG. 1, multilayer cathode 1802 is an example of electrode 302 of FIG. 3, and multilayer anode 1804 is an example of electrode 202 of FIG. 2. Cell 1800 includes a separator 1812, an electrolyte 1810, and current collectors 1806 and 1808. Electrolyte 1810 enables the transport of ions between the electrodes, and a liquid permeable polymer separator 1812 separates and electronically insulates the electrodes from each other.

Cathode 1802 includes a first layer 1830 and a second layer 1832. First layer 1830 is adjacent to current collector 1806, and second layer 1832 is adjacent (intermediate) the first layer and separator 1812. First layer 1830 and second layer 1832 each may be substantially planar, with thicknesses measured relative to a direction perpendicular to current collector 1806. First layer 1830 includes first active material particles and second layer 1832 includes second active material particles.

Characteristics regarding material composition and size distributions of the layers of cathode 1802 are substantially as described with respect to electrode 302.

Subsequently, a free energy to delithiate the first active material of first layer 1830 may be greater than a free energy to delithiate the second active material of second layer 1832. Furthermore, a solid state diffusivity of the first active material of first layer 1830 may be less than a solid state diffusivity of the second active material of second layer 1832.

Anode 1804 includes a first layer 1840 and a second layer 1842. First layer 1840 is adjacent to current collector 1808, and second layer 1842 is adjacent (intermediate) the first layer and separator 1812. First layer 1840 and second layer 1842 each may be substantially planar, with thicknesses measured relative to a direction perpendicular to current collector 1808.

First layer 1840 includes first active material particles and second layer 1842 includes second active material particles. In some examples, the first active material of first layer 1840 has a greater active volume fraction and/or active mass fraction than the active material of second layer 1842. In some examples, the active material of first layer 1840 has a lower active volume fraction and/or active mass fraction than active material of the second layer 1842.

Electrochemical cell 1800 may be substantially similar to electrochemical cell 1500 with respect to pre-lithiation. Electrochemical cell 1800 is configured to have a specific ratio between the cell's full cell reversible areal capacity and the cell's cathode reversible areal capacity. In some examples, the ratio between the full cell reversible areal capacity and the cathode reversible areal capacity is greater than or equal to 0.80. In some examples, the ratio between the full cell reversible areal capacity and the cathode reversible areal capacity is greater than or equal to 0.90. In some examples, electrochemical cell 1800 has been pre-lithiated to produce a desired ratio.

Characteristics regarding material composition and size distributions of the layers of anode 1804 are substantially as described with respect to electrode 202. Subsequently, a free energy to lithiate the first active material of first layer 1840 may be lower than a free energy to lithiate the second active material of second layer 1842. Furthermore, a solid state diffusivity of the first active material of first layer 1840 may be greater than a solid state diffusivity of the second active material of second layer 1842.

F. Illustrative Method of Manufacturing Electrochemical Cells Having Improved Capacity This section describes steps of an illustrative method 1900 for manufacturing electrochemical cells having improved capacity in accordance with aspects of the present disclosure, see FIG. 19.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 19:
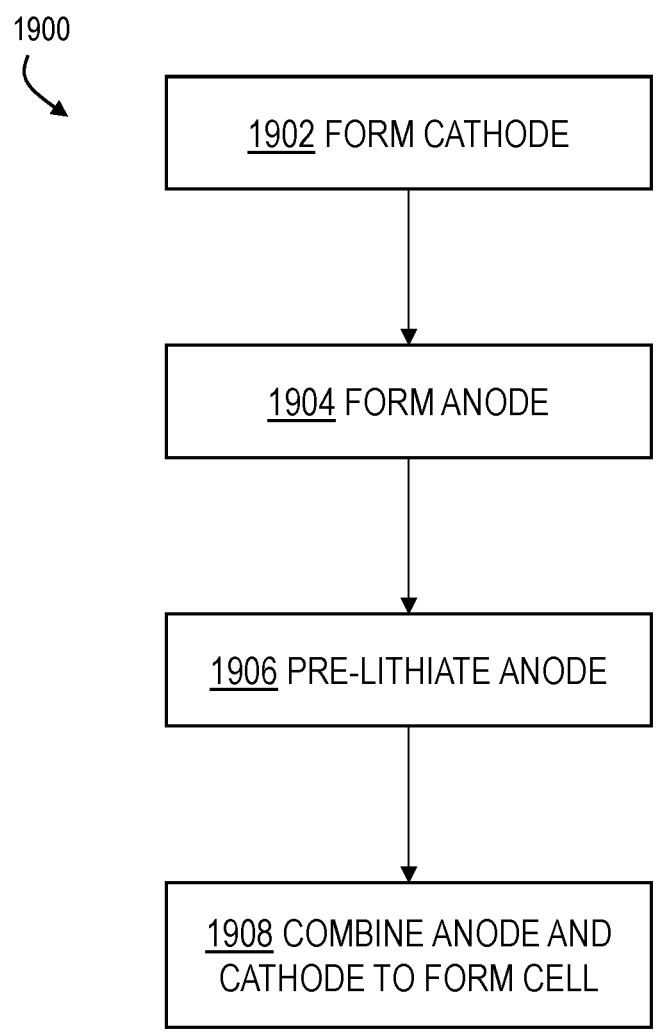
FIG. 19 is a flow chart depicting steps of an illustrative method for manufacturing an electrochemical cell.

FIG. 19 is a flowchart illustrating steps performed in an illustrative method, and may not recite the complete process or all steps of the method. Although various steps of method 1900 are described below and depicted in FIG. 19, the steps need not necessarily all be performed, and in some cases may be performed simultaneously, or in a different order than the order shown.

Step 1902 of method 1900 includes forming a cathode. In some examples, forming the cathode includes coating a current collector substrate with one or more active material composite layers. In some examples, forming the cathode optionally includes calendering the cathode. In some examples, forming the cathode includes carrying out steps described above in method 1300. In some examples, forming the cathode includes providing a cathode which has been formed previously.

Step 1904 of method 1900 includes forming an anode. In some examples, forming the anode includes forming a first layer of the anode by coating a first active material composite onto a current collector substrate and forming a second layer of the anode by coating a second active material composite onto the first layer. In some examples, forming the anode optionally includes calendering the anode. In some examples, forming the anode includes carrying out steps described above in method 1300. In some examples, forming the anode includes providing an anode which has been formed previously. Steps 1902 and 1904 may be performed in any order.

Step 1906 of method 1900 includes pre-lithiating the anode. In some examples, pre-lithiating the anode includes submerging the anode in a chemical bath in the presence of lithium ions. In some examples, pre-lithiating the anode includes submerging the anode in an electrochemical bath of lithium salts while applying an electrical field to the anode. In some examples, pre-lithiating the anode includes sprinkling the anode with stabilized lithium metal powder. In some examples, pre-lithiating the anode is a roll-to-roll process. The roll-to-roll process involves submerging anodes in a chemical or electrochemical bath of lithium salts. In some examples, pre-lithiating the anode includes dipping individual electrode sheets in a chemical or electrochemical bath. In some examples, an electrical field is applied to the submerged anodes (e.g., using field plates).

Step 1908 of method 1900 includes combining the anode and the cathode to form an electrochemical cell, wherein a ratio between a reversible areal capacity of the electrochemical cell and a reversible areal capacity of the cathode is configured to be greater than or equal to 0.80. In some examples, step 1908 includes sandwiching a separator between the anode and the cathode, such that a first side of the separator is contacting a top side (e.g., a second active material composite) of the anode and such that a second side of the separator is contacting a top side of the cathode.

G. Illustrative Combinations and Additional Examples

This section describes additional aspects and features of electrochemical cells having one or more multilayer electrodes, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An electrochemical cell comprising:
a first electrode separated from a second electrode by a liquid-permeable separator; and
an electrolyte disposed generally throughout the first and second electrodes;
the first electrode comprising a first current collector substrate and an active material composite layered onto the first current collector substrate, wherein the active material composite comprises:
a first layer adjacent the first current collector substrate and including a plurality of first active material particles adhered together by a first binder, the first active material particles configured to have a first solid state diffusivity and a first free energy to lithiate per mole;
a second layer adjacent the liquid-permeable separator and including a plurality of second active material particles configured to have a second solid state diffusivity and a second free energy to lithiate per mole;
wherein the first solid state diffusivity is greater than the second solid state diffusivity, and the first free energy to lithiate is less than the second free energy to lithiate.

A1. The electrochemical cell of A0, wherein the second electrode is substantially homogeneous.

A2. The electrochemical cell of paragraph A0 or A1, wherein the first electrode is an anode.

A3. The electrochemical cell of A2, wherein the first active material particles consist essentially of hard carbon, and the second active material particles consist essentially of graphitic carbon.

A4. The electrochemical cell of A2, wherein the first active material particles consist essentially of hard carbon and silicon monoxide, and the second active material particles consist essentially of graphitic carbon.

A5. The electrochemical cell of A2, wherein the first active material particles consist essentially of lithium titanate.

A6. The electrochemical cell of A0 or A1, wherein the first electrode is a cathode.

A7. The electrochemical cell of A6, wherein the first active material particles consist essentially of lithium iron phosphate A8. The electrochemical cell of A7, wherein the second active material particles comprise an oxide.

A9. The electrochemical cell of any of paragraphs A0 through A8, wherein a first average volumetric size of the first active material particles is smaller than a second average volumetric size of the second active material particles.

B0. An electrochemical cell comprising:
a first electrode separated from a second electrode by a liquid-permeable separator; and
an electrolyte disposed generally throughout the first and second electrodes;
the first electrode comprising a first current collector substrate and an active material composite layered onto the first current collector substrate, wherein the active material composite comprises:
a first layer adjacent the first current collector substrate and including a plurality of first active material particles adhered together by a first binder, the first active material particles configured to have a first solid state diffusivity and a first free energy to delithiate per mole;
a second layer adjacent the liquid-permeable separator and including a plurality of second active material particles configured to have a second solid state diffusivity and a second free energy to delithiate per mole;
wherein the first solid state diffusivity is lower than the second solid state diffusivity, and the first free energy to delithiate is greater than the second free energy to delithiate.

B1. The electrochemical cell of B0, wherein the second electrode is substantially homogeneous.

B2. The electrochemical cell of B0 or B1, wherein the first electrode is an anode.

B3. The electrochemical cell of B2, wherein the first active material particles consist essentially of graphitic carbon.

B4. The electrochemical cell of B2, wherein the first active material particles consist essentially of hard carbon, and the second active material particles consist essentially of lithium titanate.

B5. The electrochemical cell of B0 or B1, wherein the first electrode is a cathode.

B6. The electrochemical cell of B5, wherein the first active material particles consist essentially of lithium manganese oxide, and the second active material particles include nickel.

B7. The electrochemical cell of B6, wherein the second active material particles consist essentially of lithium nickel cobalt aluminum oxide.

B8. The electrochemical cell of B0, wherein a first average volumetric size of the first active material particles is smaller than a second average volumetric size of the second active material particles.

C0. An electrode comprising:
a current collector substrate; and
an active material composite layered onto the substrate, wherein the active material composite comprises:
a first layer adjacent the current collector substrate and including a plurality of first active material particles configured to have a first solid state diffusivity and a first energy to lithiate per mole;
a second layer adjacent the first layer and including a plurality of second active material particles configured to have a second solid state diffusivity and a second energy to lithiate per mole;
wherein the first solid state diffusivity is greater than the second solid state diffusivity, and the first energy to lithiate per mole is less than the second energy to lithiate per mole.

C1. The electrode of C0, wherein the electrode is an anode.

C2. The electrode of C1, wherein the first active material particles consist essentially of hard carbon, and the second active material particles consist essentially of graphitic carbon.

C3. The electrode of C1, wherein the first active material particles consist essentially of hard carbon and silicon monoxide, and the second active material particles consist essentially of graphitic carbon.

C4. The electrode of C1, wherein the first active material particles consist essentially of lithium titanate.

C5. The electrode of C0, wherein the electrode is a cathode.

C6. The electrode of C5, wherein the first active material particles consist essentially of lithium iron phosphate.

C7. The electrode of C6, wherein the second active material particles comprise an oxide.

C8. The electrode of paragraph C0, C1, or C5, wherein a first average volumetric size of the first active material particles is smaller than a second average volumetric size of the second active material particles.

D0. An electrochemical cell comprising:
- an anode separated from a cathode by a liquid-permeable separator; and
- an electrolyte disposed generally throughout the anode and the cathode;
- the anode comprising a first current collector substrate and an active material composite layered onto the first current collector substrate, wherein the active material composite comprises:
  - a first layer adjacent the first current collector substrate and including a plurality of first active material particles adhered together by a first binder, the first active material particles configured to have a first free energy to lithiate per mole;
  - a second layer adjacent the liquid-permeable separator and including a plurality of second active material particles configured to have a second free energy to lithiate per mole;
- wherein a ratio between a reversible areal capacity of the electrochemical cell and a reversible areal capacity of the cathode is configured to be greater than or equal to 0.80; and
- wherein the first free energy to lithiate is less than the second free energy to lithiate.

D1. The electrochemical cell of D0, wherein the anode includes a lithium source not provided by the cathode.

D2. The electrochemical cell of D0 or D1, wherein the anode includes stabilized lithium metal powder.

D3. The electrochemical cell of any of D0 through D2, wherein the cathode is formed as a single layer.

D4. The electrochemical cell of any of D0 through D3, wherein the first active material particles consist essentially of hard carbon, and the second active material particles consist essentially of graphitic carbon.

D5. The electrochemical cell of any of D0 through D4, wherein the cathode has multiple layers.

D6. The electrochemical cell of any of D0 through D5, wherein the first active material particles are configured to have a first solid state diffusivity, wherein the second active material particles are configured to have a second solid state diffusivity, and wherein the second solid state diffusivity is greater than the first solid state diffusivity.

E0. An electrochemical cell comprising:
- an anode separated from a cathode by a liquid-permeable separator; and
- an electrolyte disposed generally throughout the anode and the cathode;
- wherein a ratio between a reversible areal capacity of the electrochemical cell and a reversible areal capacity of the cathode is configured to be greater than or equal to 0.80.

E1. The electrochemical cell of E0, wherein the anode includes a lithium source not provided by the cathode.

E2. The electrochemical cell of E0 or E1, wherein the anode includes stabilized lithium metal powder.

E3. The electrochemical cell of any of E0 through E2, wherein the anode comprises hard carbon.

E4. The electrochemical cell of any of E0 through E3, wherein the anode comprises a first current collector substrate and an active material composite layered onto the first current collector substrate, wherein the active material composite comprises:
- a first layer adjacent the first current collector substrate and including a plurality of first active material particles adhered together by a first binder, the first active material particles configured to have a first free energy to lithiate per mole;
- a second layer adjacent the liquid-permeable separator and including a plurality of second active material particles configured to have a second free energy to lithiate per mole;
- wherein the first free energy to lithiate is less than the second free energy to lithiate.

E5. The electrochemical cell of E4, wherein the cathode is formed as a single layer.

E6. The electrochemical cell of E4 or E5, wherein the first active material particles consist essentially of hard carbon, and the second active material particles consist essentially of graphitic carbon.

E7. The electrochemical cell of any of E4 through E6, wherein the cathode has multiple layers.

E8. The electrochemical cell of any of E4 through E7, wherein the first active material particles are configured to have a first solid state diffusivity, wherein the second active material particles are configured to have a second solid state diffusivity, and wherein the second solid state diffusivity is greater than the first solid state diffusivity.

F0. An electrochemical cell comprising:
- an anode separated from a cathode by a liquid-permeable separator; and
- an electrolyte disposed generally throughout the anode and the cathode;
- the anode comprising a first current collector substrate and an active material composite layered onto the first current collector substrate, wherein the active material composite comprises:
  - a first layer adjacent the first current collector substrate and including a plurality of first active material particles adhered together by a first binder, the first active material particles configured to have a first free energy to lithiate per mole;
  - a second layer adjacent the liquid-permeable separator and including a plurality of second active material particles configured to have a second free energy to lithiate per mole;
- wherein the electrochemical cell is configured to have a first reversible areal capacity and wherein the cathode is configured to have a second reversible areal capacity;
- wherein a ratio between the first reversible areal capacity and the second reversible areal capacity is greater than or equal to 0.80; and
- wherein the first free energy to lithiate is less than the second free energy to lithiate.

F1. The electrochemical cell of F0, wherein the electrochemical cell has been pre-lithiated.

F2. The electrochemical cell of F0 or F1, wherein the electrochemical cell has been sprinkled with stabilized lithium metal powder.

F3. The electrochemical cell of any of F0 through F2, wherein the first active material particles consist essentially of hard carbon, and the second active material particles consist essentially of graphitic carbon.

G0. A method of manufacturing an electrochemical cell, the method comprising:
- providing a cathode;
- forming a first layer of an anode by coating a first active material composite onto a first current collector substrate, wherein the first active material composite includes a plurality of first active material particles;

forming a second layer of the anode by coating a second active material composite onto the first layer, wherein the second active material composite includes a plurality of second active material particles;

pre-lithiating the anode; and combining the anode and the cathode to form an electrochemical cell, wherein a ratio between a reversible areal capacity of the electrochemical cell and a reversible areal capacity of the cathode is configured to be greater than or equal to 0.80.

G1. The method of G0, wherein pre-lithiating the anode includes submerging the anode in a chemical bath in the presence of lithium ions.

G2. The method of G0, wherein pre-lithiating the anode includes submerging the anode in an electrochemical bath of lithium salts while applying an electrical field to the anode.

G3. The method of any of G0 through G2, further including calendering the anode.

G4. The method of any of G0 through G3, wherein providing a cathode includes forming a cathode by coating a third active material composite onto a second current collector substrate, coating a fourth active material composite onto the second active material composite, and calendering the cathode.

G5. The method of any of G0 through G4, further including sandwiching a separator between the anode and the cathode, such that a first side of the separator is contacting the second active material composite of the anode and such that a second side of the separator is contacting the fourth active material composite of the cathode.

H0. A method of manufacturing an electrochemical cell, the method comprising:

forming an anode by coating a first active material composite onto a first current collector substrate, coating a second active material composite onto the first active material composite, and calendering the anode;

pre-lithiating the anode, forming a cathode by coating a third active material composite onto a second current collector substrate, optionally coating a fourth active material composite onto the second active material composite, and calendering the cathode;

sandwiching a separator between the anode and the cathode, such that a first side of the separator is contacting the second active material composite of the anode and such that a second side of the separator is contacting the third (or fourth) active material composite of the cathode.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electrochemical cell comprising:
    an anode separated from a cathode by a liquid-permeable separator; and
    an electrolyte disposed generally throughout the anode and the cathode;
    the anode comprising a first current collector substrate and an active material composite layered onto the first current collector substrate, wherein the active material composite comprises:
        a first layer adjacent the first current collector substrate and including a plurality of first active material particles adhered together by a first binder, the first active material particles configured to have a first free energy to lithiate per mole, the first active material particles comprising a mixture of graphitic carbon and hard carbon;
        a second layer adjacent the liquid-permeable separator and including a plurality of second active material particles configured to have a second free energy to lithiate per mole;
    wherein a ratio between a reversible areal capacity of the electrochemical cell and a reversible areal capacity of the cathode is configured to be greater than or equal to 0.80; and
    wherein the first free energy to lithiate is less than the second free energy to lithiate.

2. The electrochemical cell of claim 1, wherein the cathode is formed as a single layer.

3. The electrochemical cell of claim 1, wherein the cathode has multiple layers.

4. The electrochemical cell of claim 1, wherein the second active material particles comprise graphitic carbon.

5. The electrochemical cell of claim 1, wherein the first active material particles are configured to have a first solid state diffusivity, wherein the second active material particles are configured to have a second solid state diffusivity, and wherein the second solid state diffusivity is greater than the first solid state diffusivity.

6. An electrochemical cell comprising:
    an anode separated from a cathode by a liquid-permeable separator; and
    an electrolyte disposed generally throughout the anode and the cathode;
    wherein the anode comprises a first current collector substrate and an active material composite layered onto the first current collector substrate, wherein the active material composite comprises:
        a first layer adjacent the first current collector substrate and including a plurality of first active material particles adhered together by a first binder, the first active material particles configured to have a first free energy to lithiate per mole, the first active material particles comprising a mixture of graphitic carbon and hard carbon;
        a second layer adjacent the liquid-permeable separator and including a plurality of second active material particles configured to have a second free energy to lithiate per mole;
    wherein the first free energy to lithiate is less than the second free energy to lithiate wherein the electrochemical cell is configured to have a first reversible areal capacity and wherein the cathode is configured to have a second reversible areal capacity; and wherein a ratio between the first reversible areal capacity and the second reversible areal capacity configured to be greater than or equal to 0.80.

7. The electrochemical cell of claim 6, wherein the anode includes a lithium source not provided by the cathode.

8. The electrochemical cell of claim 7, wherein the anode includes stabilized lithium metal powder.

9. The electrochemical cell of claim 6, wherein the anode comprises hard carbon.

10. The electrochemical cell of claim 6, wherein the cathode is formed as a single layer.

11. The electrochemical cell of claim 6, wherein the cathode has multiple layers.

12. The electrochemical cell of claim 6, wherein the second active material particles comprise graphitic carbon.

13. The electrochemical cell of claim 6, wherein the first active material particles are configured to have a first solid state diffusivity, wherein the second active material particles are configured to have a second solid state diffusivity, and wherein the second solid state diffusivity is greater than the first solid state diffusivity.

\* \* \* \* \*

UNITED STATES PATENT AND TRADEMARK OFFICE
CERTIFICATE OF CORRECTION

PATENT NO. : 10,991,942 B2  
APPLICATION NO. : 16/812054  
DATED : April 27, 2021  
INVENTOR(S) : Adrian Yao and Jonathan Hwang Page 1 of 1

It is certified that error appears in the above-identified patent and that said Letters Patent is hereby corrected as shown below:

In the Claims

Column 35, Lines 6-7, Claim 6: the text "and the second reversible areal capacity configured to be greater than or equal to 0.80." should read --and the second reversible areal capacity is configured to be greater than or equal to 0.80.--

Signed and Sealed this  
Fifteenth Day of June, 2021

Drew Hirshfeld  
*Performing the Functions and Duties of the  
Under Secretary of Commerce for Intellectual Property and  
Director of the United States Patent and Trademark Office*